(12) United States Patent  
Bogue

(10) Patent No.: US 12,103,214 B2  
(45) Date of Patent: Oct. 1, 2024

(54) HAND-HELD THREE-DIMENSIONAL DRAWING DEVICE

(71) Applicant: WobbleWorks, Inc., Wilmington, DE (US)

(72) Inventor: Maxwell Bogue, Hong Kong (HK)

(73) Assignee: WOBBLEWORKS, INC., Wilmington, DE (US)

( * ) Notice: Subject to any disclaimer, the term of this patent is extended or adjusted under 35 U.S.C. 154(b) by 0 days.

(21) Appl. No.: 17/751,553

(22) Filed: May 23, 2022

(65) Prior Publication Data

US 2023/0158724 A1    May 25, 2023

Related U.S. Application Data

(60) Provisional application No. 63/282,684, filed on Nov. 23, 2021.

(51) Int. Cl.
*B29C 48/02*       (2019.01)
*B29C 48/285*      (2019.01)

(52) U.S. Cl.
CPC ............ *B29C 48/02* (2019.02); *B29C 48/285* (2019.02)

(58) Field of Classification Search
CPC ....... B29C 48/02; B29C 48/285; B29C 67/00; A61M 5/315
See application file for complete search history.

(56) References Cited

U.S. PATENT DOCUMENTS

| | | |
|---|---|---|
| 1,466,509 A | 8/1923 | Laskey |
| 2,517,882 A | 8/1950 | Johnson |
| 2,926,568 A | 3/1960 | Neder |
| 3,281,576 A | 10/1966 | Cooper et al. |
| 3,285,475 A | 11/1966 | Phillips |
| RE26,180 E | 4/1967 | Frenzel et al. |

(Continued)

FOREIGN PATENT DOCUMENTS

| | | | |
|---|---|---|---|
| AU | 2015333703 | * 4/2016 | ............ A61M 5/315 |
| CN | 1285856 | 2/2001 | |

(Continued)

OTHER PUBLICATIONS

"A Range of Leister Hand-Held and Automatic Welders from Techspan," Dec. 12, 2006, retrieved from http://www.ferret.com.au/c/techspan-group/a-range-of-Leister-hand-held-automatic-welders-from-Techspan-n667443.

(Continued)

*Primary Examiner* — Christopher M Rodd  
*Assistant Examiner* — Shibin Liang  
(74) *Attorney, Agent, or Firm* — Nathan S. Smith; Samantha Kuo; Morgan, Lewis & Bockius LLP

(57) ABSTRACT

A drawing device can include a housing configured for to be held in user's hand, shaped to allow manipulation of the housing like a pen, and include a loading mechanism that supports or drives material toward a nozzle assembly of the device. The nozzle assembly has an exit nozzle from which material can be extruded. The drawing device can be configured to receive a cartridge assembly that can be coupled to the housing and be advancement mechanism and/or an automatic retraction mechanism, and allow for multiple operations, including the readying of additional material to be performed using a streamlined, synergistic activation of components, and facilitate disassembly and cleaning.

20 Claims, 12 Drawing Sheets

(56) References Cited

U.S. PATENT DOCUMENTS

| | | |
|---|---|---|
| 3,559,241 A | 2/1971 | Chu |
| 3,604,597 A | 9/1971 | Pohl et al. |
| 3,665,158 A | 5/1972 | Froedge |
| 3,887,319 A | 6/1975 | Cottingham |
| 4,032,046 A | 6/1977 | Elliott et al. |
| 4,059,204 A | 11/1977 | Duncan et al. |
| 4,114,781 A | 9/1978 | Doyel |
| 4,197,448 A | 4/1980 | Harigai |
| 4,552,287 A | 11/1985 | Dziki |
| 4,553,935 A | 11/1985 | Ueno |
| 4,597,821 A | 7/1986 | Munro |
| 4,681,524 A | 7/1987 | Ikeda et al. |
| 4,704,088 A | 11/1987 | Newman |
| 4,804,110 A | 2/1989 | Sperry et al. |
| 4,953,755 A | 9/1990 | Dennison |
| 5,071,069 A | 12/1991 | Strim |
| 5,121,329 A | 6/1992 | Crump |
| 5,169,587 A | 12/1992 | Courval |
| 5,340,433 A | 8/1994 | Crump |
| 5,672,312 A | 9/1997 | Almquist et al. |
| 5,843,490 A | 12/1998 | Horiba et al. |
| 5,853,774 A | 12/1998 | Dreve |
| 6,013,096 A | 1/2000 | Tucek |
| 6,117,385 A | 9/2000 | Chartoff et al. |
| 6,129,872 A | 10/2000 | Jang |
| 6,162,378 A | 12/2000 | Bedal et al. |
| 6,175,422 B1 | 1/2001 | Penn et al. |
| 6,202,892 B1 | 3/2001 | Lasko |
| 6,238,613 B1 | 5/2001 | Batchelder et al. |
| 6,443,675 B1 | 9/2002 | Kopras et al. |
| 6,460,481 B1 | 10/2002 | Young |
| 6,500,374 B1 | 12/2002 | Akioka et al. |
| 6,543,549 B1 | 4/2003 | Riedl et al. |
| 6,558,059 B1 | 5/2003 | Hillinger et al. |
| 6,776,602 B2 | 8/2004 | Swanson |
| 7,314,591 B2 | 1/2008 | Priedeman |
| 7,959,847 B2 | 6/2011 | Wicker et al. |
| 8,221,669 B2 | 7/2012 | Batchelder et al. |
| 8,236,227 B2 | 8/2012 | Batchelder et al. |
| 8,262,304 B2 | 9/2012 | Llach et al. |
| 8,430,085 B2 | 4/2013 | Tippmann, Sr. et al. |
| 8,439,665 B2 | 5/2013 | Batchelder et al. |
| 8,926,882 B2 | 1/2015 | Batchelder et al. |
| 8,950,629 B2 * | 2/2015 | Kapec .............. A61B 17/00491 |
| | | 222/391 |
| 9,102,098 B2 | 8/2015 | Dilworth et al. |
| 2001/0030383 A1 | 10/2001 | Swanson et al. |
| 2001/0033037 A1 | 10/2001 | Nitschke et al. |
| 2002/0086264 A1 | 7/2002 | Okawa et al. |
| 2003/0137077 A1 | 7/2003 | Lee et al. |
| 2004/0232165 A1 | 11/2004 | Lee |
| 2004/0244603 A1 | 12/2004 | Magers |
| 2005/0129941 A1 | 6/2005 | Comb et al. |
| 2005/0288813 A1 | 12/2005 | Yang et al. |
| 2006/0051442 A1 | 3/2006 | Miceli et al. |
| 2006/0063126 A1 | 3/2006 | Aloise et al. |
| 2006/0198918 A1 | 9/2006 | Koyagi et al. |
| 2006/0269639 A1 | 11/2006 | Bortoli |
| 2007/0003656 A1 | 1/2007 | LaBossiere et al. |
| 2007/0029693 A1 | 2/2007 | Wigand et al. |
| 2007/0045337 A1 | 3/2007 | Hornsby et al. |
| 2007/0228590 A1 | 10/2007 | LaBossiere et al. |
| 2008/0197116 A1 | 8/2008 | Achtner et al. |
| 2008/0213419 A1 | 9/2008 | Skubic et al. |
| 2009/0133800 A1 | 5/2009 | Morohoshi et al. |
| 2009/0274540 A1 | 11/2009 | Batchelder et al. |
| 2009/0283544 A1 | 11/2009 | Salmela et al. |
| 2010/0106132 A1 | 4/2010 | Simonton |
| 2010/0147465 A1 | 6/2010 | Di Miceli |
| 2010/0166969 A1 | 7/2010 | Batchelder |
| 2010/0283172 A1 | 11/2010 | Swanson |
| 2010/0327479 A1 | 12/2010 | Zinniel et al. |
| 2011/0074065 A1 | 3/2011 | Batchelder et al. |
| 2011/0076496 A1 | 3/2011 | Batchelder et al. |
| 2011/0079936 A1 | 4/2011 | Oxman |
| 2011/0196660 A1 | 8/2011 | Liu et al. |
| 2012/0070523 A1 | 3/2012 | Swanson et al. |
| 2012/0219699 A1 | 8/2012 | Pettersson et al. |
| 2012/0258190 A1 | 10/2012 | Batchelder et al. |
| 2013/0209600 A1 | 8/2013 | Tow |
| 2013/0234366 A1 | 9/2013 | Batchelder et al. |
| 2014/0044823 A1 | 2/2014 | Pax et al. |
| 2014/0120197 A1 | 5/2014 | Swanson et al. |
| 2014/0154347 A1 * | 6/2014 | Dilworth .............. B29C 48/05 |
| | | 425/87 |
| 2014/0159273 A1 | 6/2014 | Koop et al. |
| 2014/0291886 A1 | 10/2014 | Mark et al. |
| 2014/0328963 A1 | 11/2014 | Mark et al. |
| 2015/0096717 A1 | 4/2015 | Batchelder et al. |
| 2015/0137402 A1 | 5/2015 | Schmehl et al. |
| 2015/0147427 A1 | 5/2015 | Lundwall et al. |
| 2015/0165691 A1 | 6/2015 | Mark et al. |
| 2015/0331412 A1 | 11/2015 | Adair et al. |
| 2016/0031159 A1 | 2/2016 | Church et al. |
| 2017/0057168 A1 | 3/2017 | Miller et al. |
| 2017/0120519 A1 | 5/2017 | Mark |
| 2017/0157826 A1 | 6/2017 | Hishiki |
| 2017/0182701 A1 | 6/2017 | Ryan |
| 2018/0065286 A1 * | 3/2018 | Pruitt .................. B29C 45/2673 |
| 2018/0272379 A1 * | 9/2018 | Skinner ................ B43K 19/00 |
| 2018/0345559 A1 | 12/2018 | Dilworth et al. |
| 2020/0282659 A1 * | 9/2020 | Lan ..................... B29C 64/364 |

FOREIGN PATENT DOCUMENTS

| | | |
|---|---|---|
| CN | 1640643 | 7/2005 |
| CN | 2761402 | 3/2006 |
| CN | 2813176 | 9/2006 |
| CN | 101070020 A | 11/2007 |
| CN | 101166597 | 4/2008 |
| CN | 101172428 | 5/2008 |
| CN | 101213060 A | 7/2008 |
| CN | 201086388 | 7/2008 |
| CN | 202079738 | 12/2011 |
| CN | 202399493 | 8/2012 |
| CN | 102922721 | 2/2013 |
| CN | 203198622 U | 9/2013 |
| CN | 203371791 | 1/2014 |
| CN | 203449607 | 2/2014 |
| CN | 103707511 | 4/2014 |
| CN | 203592687 | 5/2014 |
| DE | 8332750 U1 | 3/1984 |
| DE | 3341201 | 5/1985 |
| EP | 257838 | 3/1988 |
| EP | 0363124 A2 | 4/1990 |
| EP | 2928672 B1 | 3/2022 |
| JP | S 61-141959 | 6/1986 |
| JP | S63-101887 | 5/1988 |
| JP | S 63-205216 | 8/1988 |
| KR | 20110003257 U | 3/2011 |
| WO | WO 99/32544 | 7/1999 |
| WO | WO 2009/134298 | 11/2009 |
| WO | WO 2012/088257 | 6/2012 |
| WO | WO 2012/152510 | 11/2012 |
| WO | WO 2012/152511 | 11/2012 |
| WO | WO2014/088681 A1 | 6/2014 |
| WO | WO 2015/020944 | 2/2015 |
| WO | 2016/061062 * | 4/2016 ............ A61M 5/315 |

OTHER PUBLICATIONS

"Diode PID/S: The powerful pair." Plastic Welding General Catalog, disclosed Jun. 2019, 3 pages.

"Electron ST—Strong, Compact and handy," Plastic Welding General Catalog, disclosed Jun. 2019, 2 pages.

"Handheld Product Ergonomic Design," Human Engineering, Jun. 2011, vol. 17, No. 2, pp. 186-189.

"Hot Jet S: Small and powerful," Plastic Welding General Catalog, disclosed Jun. 2019, 2 pages.

"Leister Diode S Diode PID," Aug. 2018, 84 pages.

"Leister Electron ST Hot Air Tool—User Manual," Oct. 2017, 40 pages.

(56) References Cited

OTHER PUBLICATIONS

"Leister Hot Jet S," Manual, Oct. 2017, 87 pages.
"Leister Triac ST Hot Air Tool—User Manual," Oct. 2018, 40 pages.
"Leister Welding Pen S Welding Pen R," Sep. 2005, 82 pages.
"Triac ST—Design meets experience," disclosed Jun. 2019, 4 pages.
"Welding Pen: Slim and flexible," Plastic Welding General Catalog, disclosed Jun. 2019, 2 pages.
MakiBox Update—A6 Printing Smoothly, Public Demos, and the Scribble, Nov. 28, 2012, retrieved from https://web.archive.org/web/20121203045530/http://makibox.com/blogpost/items/makibox_smooth_print_public_demo_and_scribble, 11 pages.
3Doodler: The World's First 3D Printing Pen by WobbleWorks LLC—Kickstarter, retrieved from https://www.kickstarter.com/projects/1351910088/3doodler-the-worlds-first-3d-printing-pen\description, 9 pages, last updated Nov. 25, 2014.
Amended Complaint for Patent Infringement and Demand for Jury Trial, *Wobbleworks, Inc.* v. *Ditech Solutions, LLC*, Case No. 8:17-CV-2147, dated Apr. 13, 2018, 22 pages.
Category: Extruders—RepRap, last revised Oct. 9, 2021, retrieved from https://reprep.org/mediawiki/index.php?title=Category:Extruders&oldid=67755, 7 pages.
Complaint for Patent Infringement and Demand for Jury Trial, *Wobbleworks, Inc.* v. *Ditech Solutions, LLC*, Case No. 8:17-CV-2147, dated Dec. 8, 2017, 9 pages.
Conduct of Proceeding Order, *Ditec Solutions, LLC* v *Wobbleworks, Inc*, Case IPR2018-01414, Oct. 24, 2018, 6 pages.
Decision Denying Institution of Inter Partes Review, *Ditec Solutions, LLC* v *Wobbleworks, Inc.*, Case IPR2018-01414, Jan. 15, 2019, 20 pages.
Decision Denying Petitioner's Request for Rehearing, *Ditec Solutions, LLC* v. *WobbleWorks, Inc.*, Case IPR2018-01414, entered Mar. 13, 2019, 10 pages.
Declaration of David Trumper in Support of Inter Partes Review of U.S. Pat. No. 9,731,444, May 20, 2018, 43 pages.
Declaration of Dr. Kimberly Cameron, Oct. 23, 2018, 14 pages.
Declaration of Lance Wyatt, Inter Partes Review of U.S. Pat. No. 9,731,444, May 24, 2018, 2 pages.
Ditec's Answer and Counterclaims to Wobbleworks' Complaint, *Wobbleworks, Inc.* v. *Ditech Solutions, LLC*, Case No. 8:17-CV-2147, dated Apr. 25, 2019, 12 pages.
Ditec's Answer and Counterclaims to Wobbleworks' First Amended Complaint, *Wobbleworks, Inc.* v. *Ditech Solutions, LLC*, Case No. 8:17-CV-2147, dated Apr. 19, 2018, 10 pages.
Donutman.sub.--2000 "Plastic Welding Gun (Plastruder MK4)" published Sep. 19, 2010, http://www.thingiverse.com/thing:4156, last accessed Jul. 3, 2014.
Draw in the Air with 3Doodler—3d Printing Era, Feb. 19, 2013, retrieved from www.3dpringinera.com/draw-in-the-air-with-3doodler/, 2 pages.
EP 13861105.8, Acknowledgment of receipt of observations by third parties, dated Oct. 18, 2021, 2 pages.
EP 13861105.8, Third Party Observations dated Aug. 16, 2019, 27 pages, including attachments.
EP 13861105.8, Third Party Observations dated Oct. 18, 2021, 85 pages.
Fung 2037—Turns out the Makible team had the . . . , Feb. 23, 2013, retrieved from https://fung2037.tumblr.com/post/43847991789/turns-out-the-makibox-makible-team-had-the, 2 pages.
Interview with 3Doodler Co-creator Max Bogue, Feb. 28, 2013, retrieved from blog/makezine.com/2013/02/28/interview-with-3doodler-co-creator-max-bogue/, 7 pages.
MakerBot Industries: Plastruder MK4, 2009, retrieved from web.archive.org/web/20091012055654/http://wiki.makerbot.com\plastruder-mk4, 34 pages.
Matt Wax Gun for Jewelry Design: Working in Air, on an Object & with a Pattern, Sep. 6, 2011, available at https://www.youtube.com/watch?v=LNg9BccQFJc.

Patent Owner's Exhibit List, *Ditec Solutions, LLC* v *Wobbleworks, Inc*, Case IPR2018-01414, Oct. 24, 2018, 3 pages.
Patent Owner's Preliminary Response, *Ditec Solutions, LLC* v *Wobbleworks, Inc*, Case IPR2018- 01414, Oct. 24, 2018, 30 pages.
Personnel Record of David L. Trumper, May 2018, 50 pages.
Petition for Inter Partes Review of U.S. Pat. No. 9,731,444, Jul. 19, 2018, 70 pages.
Second Amended Complaint for Patent Infringement and Demand for Jury Trial, *Wobbleworks, Inc.* v. *Ditech Solutions, LLC*, Case No. 8:17-CV-2147, dated Apr. 9, 2019, 16 pages.
Summary of the Current Allegations from the Petitioner in the Invalidation Notice of Nov. 26, 2021, and comments.
YouTube posted by Jon Buford, published on Nov. 27, 2012, retrieved from https://www.youtube.com/watch?v=ef03qSz-yC8, 4 pages.
International Search Report and Written Opinion of Application No. PCT/US2022/030608, dated Nov. 3, 2022, 17 pages.
MakerBot Thingiverse, Plastic Welding Gun (Plastruder MK4), available at https://www.thingiverse.com/thing:4156, dated 19.09.2010, 8 pages.
Thingiverse, Plastic Welding Gun Extract (Plastruder MK4) by donutman_2000, from Wayback machine, available at https://www.thingiverse.com/thing:4156, dated Nov. 15, 2010, 2 pages.
Thinking in 3D, 3D Printing Filament Tool, from Wayback machine, available at https://blog.richmond.edu/ti3d/2013/02/27/3d-printing-filament-tool/, dated Feb. 27, 2013, 2 pages.
MakerBot Industries, Robots that Make Things, Plastruder MK4, from Wayback machine, available at http://wiki.makerbot.com/plastruder-mk4, dated Oct. 12, 2010, 34 pages.
MakiBox #Scribble—In Action at HackJam, screenshots from youtube https://www.youtube.com/watch?v=ef03qSz-yC8 and https://www.youtube.com/watch?v=PLCN7FJsFwQ, published on Nov. 27, 2012, 4 pages.
Makox, #MakiBox Update—A6 Printing Smoothly, Public Demos, and the Scribble, screenshots from webarchive.org, available at http://makibox.com/blogpost/items/makibox_smooth_print_public_demo_and_scribble, dated Dec. 3, 2012, 11 pages.
Interview with 3Doodler Co-creator Max Bogue, dated Feb. 28, 2013, available at blog.makezine.com/2013/02/28/interview-with-3doodler-co-creator-max-bogue/ (including video link to https://www.youtube.com/watch?v=q47CzPQLroQ/=E20, published online Feb. 22, 2013), 7 pages.
3d Printing Era, Draw in the Air with 3Doodler, available at http://www.3dprintingera.com/draw-in-the-air-with-3doodler/, dated Feb. 19, 2013, 2 pages.
Kickstarter, 3Doodler: The World's First 3D Printing Pen, available at https://www.kickstarter.com/projects/1351910088/3doodler-the-worlds-first-3d-printing-pen/posts, dated Feb. 19, 2013, 9 pages.
How 2 Today, The Development of 3Doodler, available at https://how2today.wordpress.com/2013/02/22/the-development-of-3doodler/ (including video link to https://www.youtube.com/watch?v=q47CzPQLroQ/=E20), dated 22.02.2013, 1 page.
Screenshots from Youtube video, available at https://www.youtube.com/watch?v=q47CzPQLroQ, dated Feb. 22, 2013, 3 pages.
3D structure printing pen came out: plastic for ink can, available at http://tech.sina.com.cn/d/2013-02-22/09478080960.shtml, dated Feb. 22, 2013, including English translation, 8 pages.
PP3DP, UP!User Manual, dated 2012, 54 pages.
Techwombat, Roundup—The Best Cheap 3D Printers of 2012, available at https://techwombat.com/roundup-best-cheap-3d-printers-2012-2013/, dated Jan. 1, 2023 (showing UP! Plus printer on p. 4), 7 pages.
Extruder Head for UP Plus/UP Plus 2/UP Mini 3D Printer, available at https://www.3dprinting.com.au/products/parts/up-plus-parts/extruder-head-for-up-3d-printer/, dated Dec. 30, 2022, 4 pages.
Category: Extruders—RepRap, available at https://reprap.org/mediawiki/indexphp?title=Category:Extruders&old id=67755, dated Oct. 9, 2012, 7 pages.
Wikipedia: Printrbot, available at https://en.wikipedia.org/w/index.php?title=Printrbot&oldid=525625985, dated Nov. 30, 2012, 3 pages.
Screenshots from the Youtube video "Matt Wax Gun for Jewelry Design: Designing on Water," available at https://www.youtube.com/watch?v=hUatuG1i7k4, dated Sep. 8, 2011, 3 pages.

(56) References Cited

OTHER PUBLICATIONS

Screenshot of ifanr, Where is the "Magic Paintbrush"? The domestic 3D printing pen is released, available at www.ifanr.com/coolbuy/296254, dated May 22, 2013, including translation, 2 pages.

Wayback machine of www.ifanr.com/coolbuy/296254, ifanr, Where is the "Magic Paintbrush"? The domestic 3D printing pen is released, dated Jun. 9, 2013, including translation, 3 pages.

Jaksic, N., "BYOE: Using 3D Pens for Enhancement and Rework of 3D-Printed Parts," Colorado State University—Pueblo, dated 2015, 11 pages.

FTIstrap, available at https://reprap.org/wiki/FTIStrap, dated Jan. 2, 2023, 93 pages.

Hacker News, 3D printing pen lets you draw sculptures in thin air, dated Aug. 1, 2021, 2 pages.

Hacker New, 3Doodler: The World's First 3D Printing Pen, dated Aug. 1, 2021, 2 pages.

Wayback machine of www.ifanr.com/coolbuy/296254, ifanr, Where is the "Magic Paintbrush"? The domestic 3D printing pen is released, dated Jun. 9, 2013, including translation, 2 pages.

Consolidated List of Cited Opposition Documents, EP Application No. 13861105.8, dated Jul. 6, 2023.

* cited by examiner

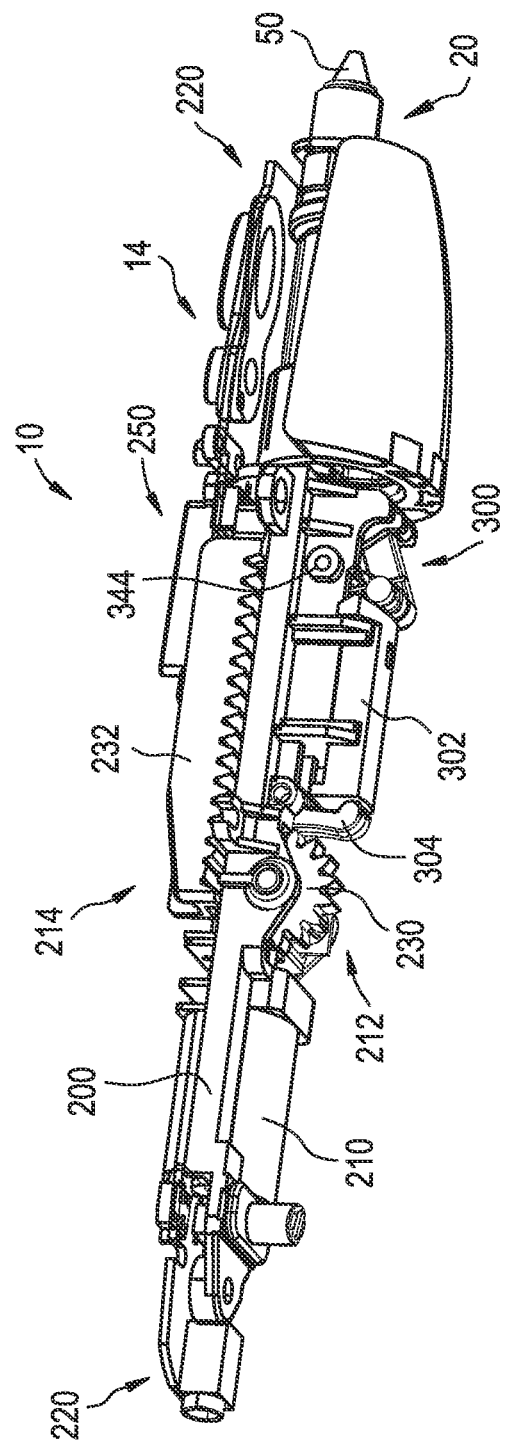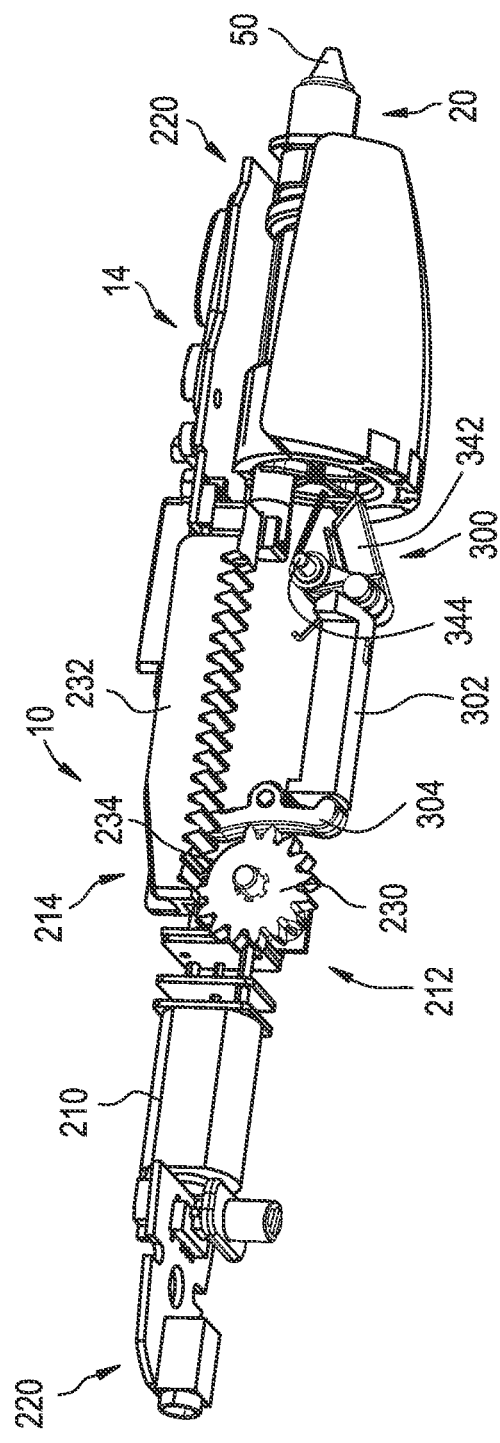

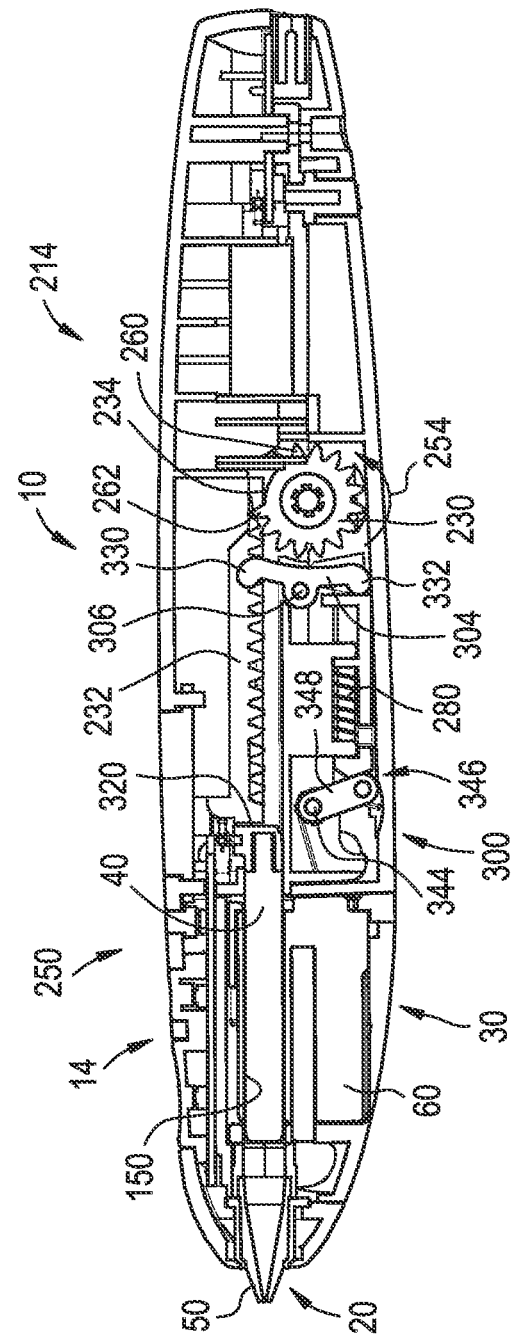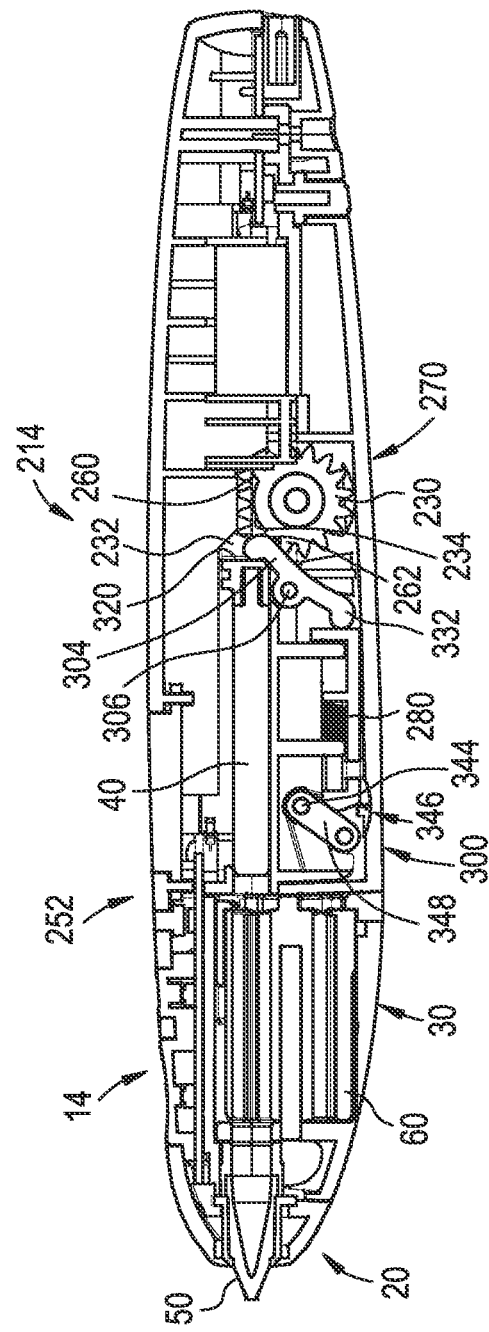

HAND-HELD THREE-DIMENSIONAL DRAWING DEVICE

CROSS-REFERENCE TO RELATED APPLICATIONS

This application claims priority to and the benefit of U.S. Provisional App. No. 63/282,684, filed on Nov. 23, 2021, the entirety of which is incorporated hereinby reference.

BACKGROUND

Field

The present disclosure relates to extrusion devices and, in particular, a hand-held implement configured to extrude a material so as to construct three-dimensional (3D) objects.

Description of the Related Art

Various devices have been developed that allow a user to incorporate specific designs and artwork into food creations. Some devices allow a user to decorate cakes and cookies with icing. Other devices allow a user to melt sugar and pour the molten material into molds or other substrates. These devices generally give the user some control over how the material is dispensed, with some being in the form of a gun having a trigger for driving material toward the dispensing tip.

These devices have found some application and appealed to various users. However, broad adoption has been limited due to certain limitations and drawbacks associated with these devices.

SUMMARY

The present disclosure describes drawing devices and methods that can allow users to create unique designs and workpieces using a variety of different materials. Further, the present disclosure also describes aspects of drawing devices and methods that allow for quick reloading and maintenance of the device in order to permit users to more easily focus on the artwork rather than the tool through which the artwork is being created.

In accordance with some embodiments disclosed herein is the realization that as projects become more complex with other external factors that demand the user's attention, the drawing device should provide a simple, dependable, customizable, and long-lasting material distribution or flow so that the user can focus on critical aspects of the project itself. For example, in the food industry, a pâtissier can use embodiments of the drawing device to adorn their products, but must be aware of other factors, such as the balance, consistency, or temperature of the substrate or delicacy, as well as other aspects of their project, which are all time sensitive and require exacting attention to detail.

Some embodiments of the present disclosure describe a hand-held drawing device that allows a user to "draw" a 2D or 3D structure and to easily refill or replace the material or feed stock. Optionally, some embodiments can be configured such that the drawing devices or methods can be used to transform materials, such as sugar, gummy, or other edible materials, into artistic creations for adorning food or drink items. Until now, the use of certain materials in the manner described herein has been limited based on several factors.

For example, in accordance with an aspect of some embodiments is the realization that the use of sugar in a transformational manner is difficult due to various challenges, including the difficulty of melting and handling sugar in such apparatuses, advancing molten sugar over a meaningful distance, and providing a reliable and useful extruding tool, to name a few.

Further, in accordance with an aspect of some embodiments is the realization that melting and extruding a material, such as sugar, can present substantial difficulty due to the challenging properties of molten sugar and its handling, which may include stickiness, quick hardening, as well as overheating or burning of the material. In developing the concepts and disclosure presented herein, Applicant discovered the challenge of successfully pushing sugar across a certain distance, and how difficult such a process is.

Furthermore, other challenges arose, such as being able to successfully and rapidly replace and/or reload material into the device so that the continuity of creation is uninterrupted. Moreover, Applicant also realized the challenge of making the device and process accessible to an artist by ensuring a comfortable, easy-to-hold device that could be manipulated like a pen.

With these and other challenges in mind, Applicant developed the presently disclosed devices and methods and has accessed a new market in the cool and airy industry that will allow for masterful, detailed art to be incorporated into food and drink products on a professional and household scale. These and other advancements represent a substantial new product segment, for which Applicant has received enthusiastic feedback and expects incredible results for its business.

Accordingly, some embodiments can provide a handheld drawing device that comprises a housing, a nozzle assembly, and a loading mechanism. The housing can have an internal volume, a longitudinal axis, and a port that permits access to the internal volume of the housing.

The loading mechanism can position or drive material toward the nozzle assembly for extrusion therefrom. The loading mechanism can comprise an advancement mechanism to drive the material toward the nozzle assembly. The loading mechanism can optionally comprise a cartridge that supports or carries material and that can be releasably coupled to the housing.

In some embodiments, the cartridge can be is removably insertable into the port of the housing and have a rotation axis and a plurality of chambers disposed thereabout. Each of the plurality of chambers can be configured to support a pellet of material therein and be rotatable about the rotation axis to selectively position an active chamber of the plurality of chambers in alignment with the longitudinal axis at an active position.

Once in position, the material disposed in the active chamber can be advanced toward the nozzle assembly. The nozzle assembly can be coupled to the device and comprise an exit nozzle and a heating element that can facilitate melting and extrusion of the material from the device.

In some embodiments, the device can further comprise a pushrod disposed within the housing and translatable along the longitudinal axis. The pushrod can be movable into the active chamber toward an extended position for driving the pellet out of the active chamber toward the heating element for melting the pellet and extruding the material.

The pushrod can be driven by a motor, a type of spring (coil or leaf), user-applied force, or other driving mechanism to cause movement of the pushrod into and/or away from the extended position. Thus, some embodiments do not use a motor for operation.

For example, the device can comprise an advancing mechanism that drives movement of the material out of the active chamber toward the nozzle assembly. The advancing mechanism can perform manual (e.g., completed via manual input of a kinetic energy or storing of potential energy, such as into a spring, compressed fluid/air, or otherwise) or motorized movement of components. Such manual movement can be performed by directly advancing the pushrod by pushing on the pushrod (linear drive), pulling back on the pushrod to preload a spring coupled to the pushrod and then permitting the spring to exert a linear force on the pushrod (linear drive), rotation of a thumb wheel to advance the pushrod (rotary movement about or transverse relative to a longitudinal axis of the device), or combinations of such linear and rotary movement Thus, some embodiments do not use a motor, but instead use a manually inputted driving force, such as a type of spring (coil or leaf), user-applied force, or other driving mechanism.

In some embodiments, the advancing mechanism of the device can comprise a motor, a type of spring (coil or leaf), user-applied force, or other driving mechanism that is coupled to the device. The driving mechanism can be configured to drive motion of the pushrod to the extended position. Further, the device can optionally comprise one or more actuators coupled to the device. The actuator(s) can be configured to activate the driving mechanism and control movement of the pushrod. The user can thereby extrude the pellet from the exit nozzle.

Additionally, some embodiments can comprise a retraction mechanism whereby the pushrod can be urged toward the retracted position from the extended position. The pushrod can be manually or automatically urged toward the retracted position from the extended position.

Optionally, the device can comprise a reloader mechanism that facilitates loading of material into the device. For example, the reloader mechanism can comprise a screw drive mechanism, a pushrod mechanism, a clip mechanism, a belt mechanism, and/or a wave drive mechanism. The reloader mechanism can utilize one or more material loading components, such as hoppers, cartridges, clips, and/or belts that can be used in accordance with some embodiments to provide a quick and simple manner of achieving steady or continuous usage of the device, with minimal interruption to the user.

These and other features can advantageously allow the user to focus more on the actual work being performed using the device rather than getting the device to work properly.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 7 and 8 are perspective views of a drawing device in which the housing has been removed to illustrate internal components thereof, according to some embodiments.

FIGS. 9 and 10 are side, cross-sectional views of a drawing device showing extended and retracted positions of a pushrod, according to some embodiments.

DETAILED DESCRIPTION

Figure 1:
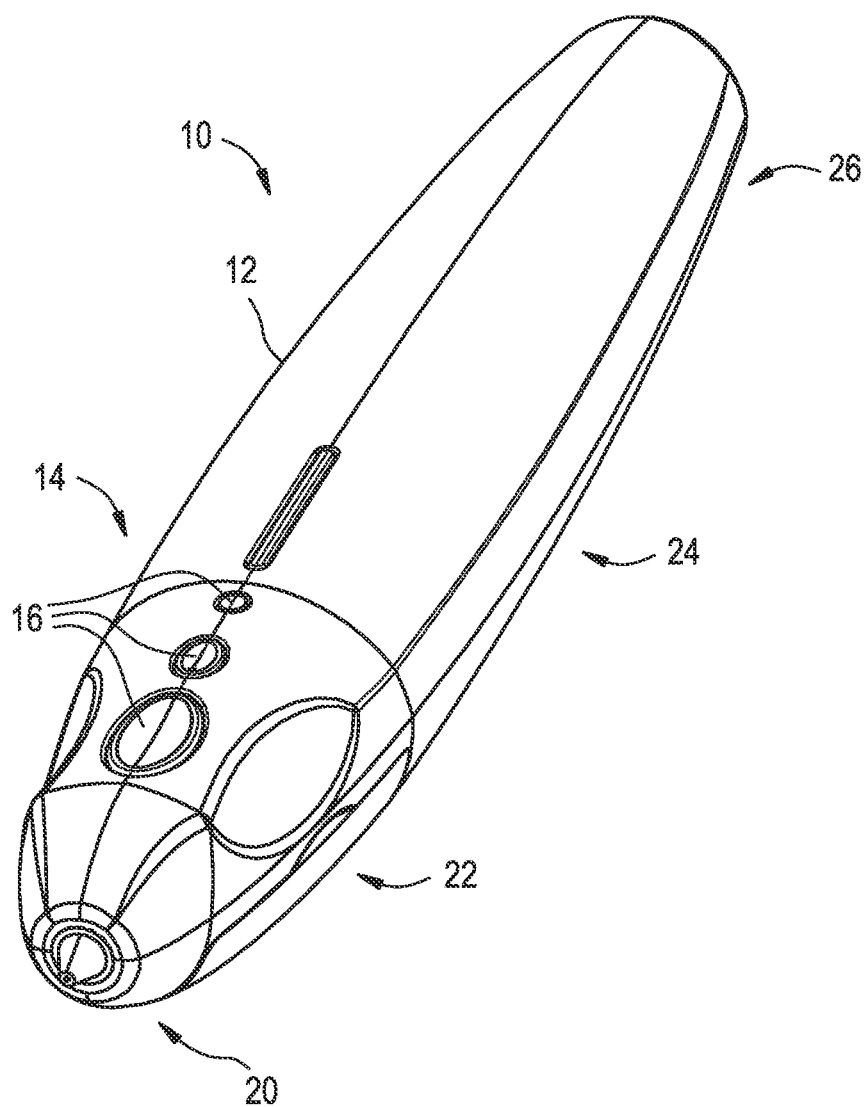
FIG. 1 is a perspective view of a cartridge-type drawing device, according to some embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

The present disclosure describes various features of a hand-held drawing device that can comprise a three-dimensional drawing pen having a housing, a nozzle assembly, and a loading mechanism. The loading mechanism can advantageously facilitate use of the 3D drawing pen, for example, by providing a substantial or semi-continuous supply of material to the nozzle assembly for extrusion and artistic creation.

The loading mechanism can comprise an advancement mechanism to drive the material toward the nozzle assembly.

The loading mechanism can optionally comprise a cartridge that supports or carries material for use by the 3D pen. The cartridge can be releasably coupled to the housing of the 3D pen.

In some embodiments, the loading mechanism can also optionally comprise a reloading mechanism that repositions material to an active position and for driving the material toward the nozzle assembly.

Various embodiments of loading mechanisms, including cartridge-type and non-cartridge-type loading mechanisms, along with various advancement and reloading mechanisms are discussed and illustrated herein. These and other features can be individually modified or implemented into one or more embodiments of the drawing pen disclosed herein. Accordingly, features illustrated in the figures may be interchangeably incorporated into a given embodiment, as discussed and shown herein.

Referring now to the figures, various aspects of an embodiment of the present disclosure are illustrated in FIGS. 1-18. FIG. 1 is a front perspective view of a hand-held extrusion apparatus or drawing device 10 in accordance with some embodiments of the present disclosure. As illustrated, the drawing device 10 can comprise an elongate housing 12 that can be sized and configured to fit in a user's hand and suitably shaped to allow for manipulation like a writing instrument, such as a pen or pencil. The drawing device 10 can comprise one, two, three, or more actuators 14. The actuator 14 can be in the form of one or more buttons 16, which can be positioned along the housing at a location that allows the user to press or move the actuator 14, thereby activating one or more functions of the drawing device 10. Although the actuator 14 is illustrated as a series of buttons 16, the actuator 14 can comprise other functional components, such as switches, sliders, or other such features known in the art.

The drawing device 10 can also comprise a nozzle assembly 20 and a loading mechanism 21. The nozzle assembly 20 can be positioned at a distal end portion of the drawing device 10. The user can manipulate the drawing device 10 by gripping the housing 12 proximal to the distal end portion 22 along a central portion 24 and a proximal end portion 26.

Figure 2:
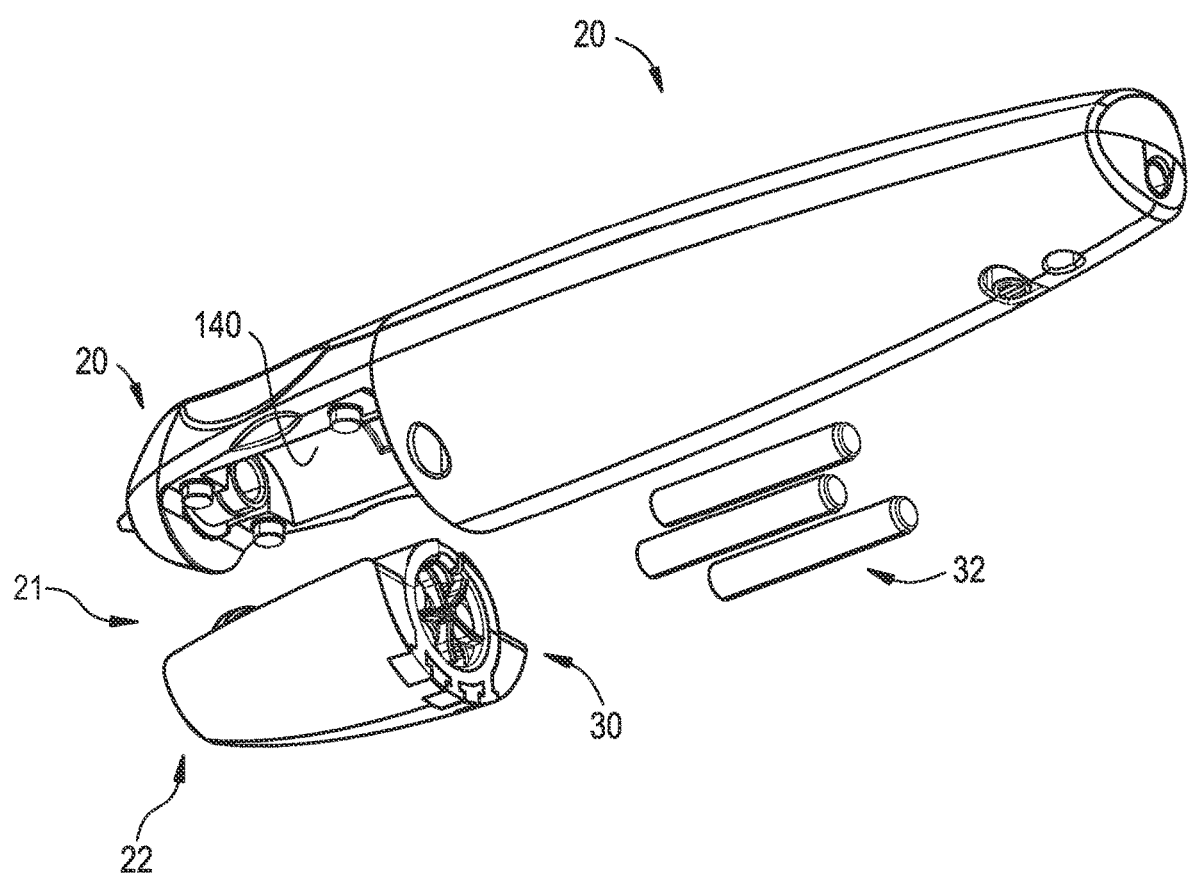
FIG. 2 is a bottom perspective view of the drawing device shown in FIG. 1, with a cartridge assembly separated from a body of the drawing device, according to some embodiments.

Referring now to FIG. 2, the drawing device 10 is shown in a bottom perspective view to illustrate how the drawing device 10 can be loaded with material. The drawing device 10 can comprise a loading mechanism that can include a removable cartridge assembly 30. The removable cartridge assembly 30 can be inserted into and attached to the drawing device 10. Advantageously, the cartridge assembly 30 can support material, in the form of one or more pellets 32, adjacent to the nozzle assembly 20, thereby enabling the material 32 to be advanced toward the nozzle assembly 20 along a short or minimal distance. The pellets 32 can be oblong or round in shape, for example, in the shape of a stick of material. As noted above, the length of travel of material has been identified as one of the significant challenges in developing a reliable, user-friendly drawing device that does not clog or become cumbersome in use. The cartridge assembly 30 and its placement and loading onto the drawing device 10 and the illustrated embodiment advantageously provide a robust and innovative approach for at least the reasons that the material 32 can be quickly loaded and driven out of the cartridge assembly 30 during use of the drawing device 10.

Figure 3:
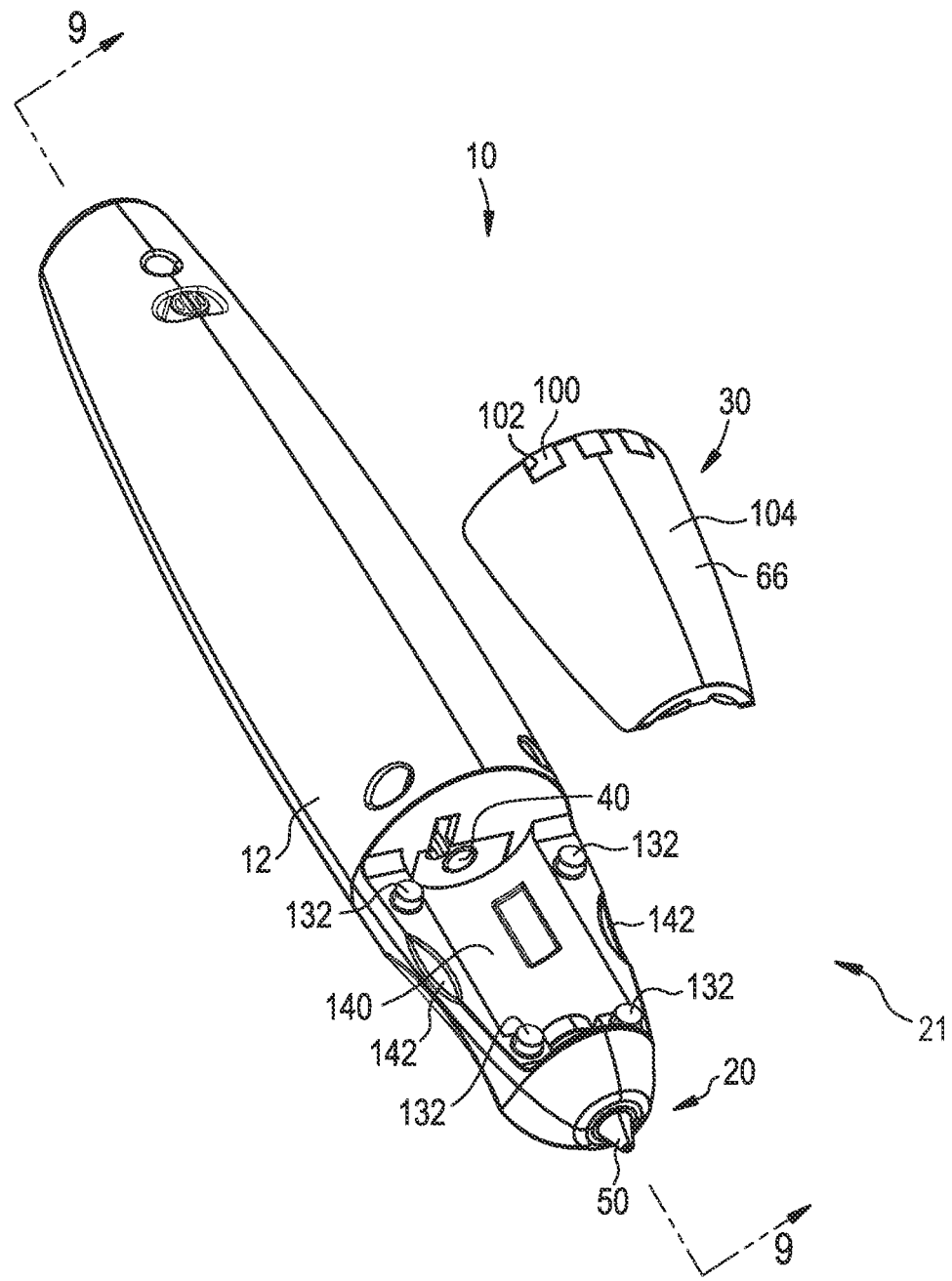
FIG. 3 is a bottom perspective view showing aspects of a docking receptacle of the drawing device shown in FIG. 1, according to some embodiments.

As illustrated in FIG. 3, a push rod 40 of the drawing device 10 can be used to advance or urge material residing in the cartridge assembly 30 toward the nozzle assembly 20. As the material enters the nozzle assembly 20, the material can be melted and extruded out of the exit nozzle 50. After the push rod 40 has completed its full cycle, the cartridge assembly 30 can rotate to permit another chamber of the cartridge assembly 32 be aligned with the push rod 40 so that the user can activate the push rod 40 to drive additional material through the drawing device 10 in order to thereby extruded from the exit nozzle 50.

Figure 4:
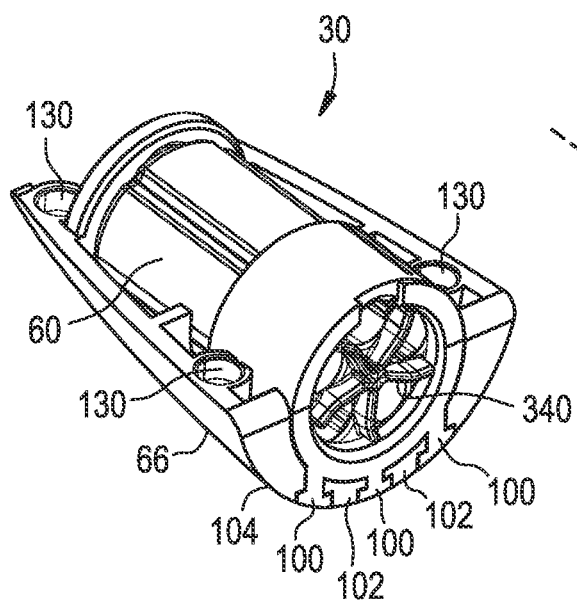
FIG. 4 is a perspective view of a cartridge assembly for use with the drawing device FIG. 1, according to some embodiments.
Figure 5:
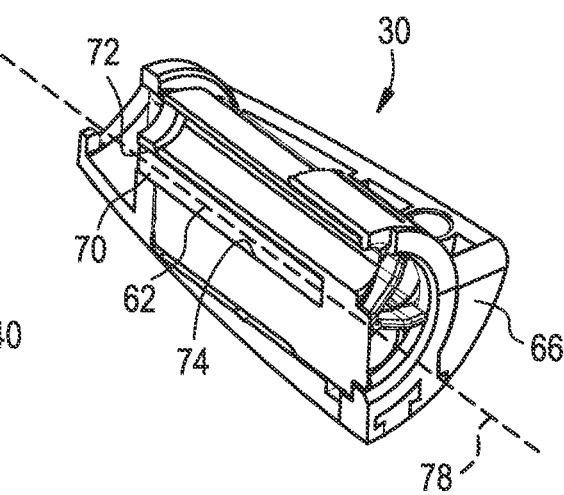
FIG. 5 is a perspective, cross-sectional view of the cartridge assembly of FIG. 4.
Figure 6:
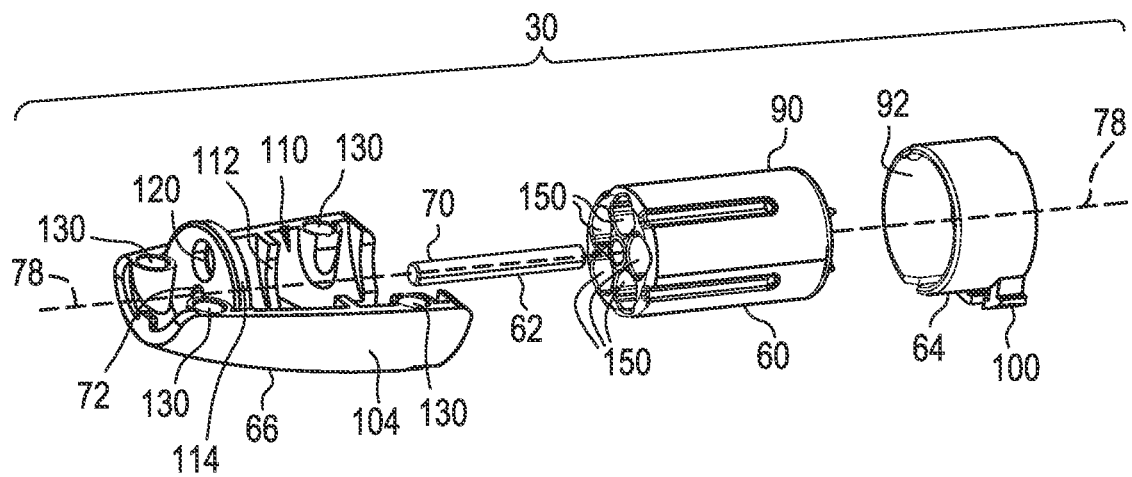
FIG. 6 is an exploded view of the cartridge assembly of FIG. 4.

The cartridge assembly 30 and its operation, as illustrated in FIGS. 2 and 3, is shown in greater detail in FIGS. 4-6. As shown, the cartridge assembly 30 can comprise a cartridge 60, a rotational shaft 62, a mounting component, 64, and a buckle cover 66.

FIG. 4 illustrates an embodiment of the cartridge assembly in an assembled state. As shown, the cartridge 60 can be received within the mounting component 64 and coupled to the buckle cover 66. The rotational shaft 62 can define a first end 70 that extends into a rotational aperture 72, as shown in FIG. 5. The rotational engagement between the rotational aperture 72 and the first end 70 of the rotational shaft 62, as well as the rotational coupling between the rotational shaft 62 and a central bore 74 of the cartridge 60, can enable the cartridge 60 to be positioned in a mounted configuration. In the mounted configuration, as shown in FIG. 5, the cartridge 60 can freely rotate about a cartridge axis 78. Further, the mounting component 64 can at least partially receive an end portion 90 of the cartridge 60 within an engagement cavity 92 of the mounting component 64. In some embodiments, the engagement cavity 92 can comprise a cylindrical recess that extends longitudinally along a central axis of the mounting component. The engagement cavity 92 can be configured to be coaxially aligned with the cartridge axis 78 in order to permit the cartridge 60 to be at least partially received within the engagement cavity 92 of the mounting component 64.

Additionally, in accordance with some embodiments, the mounting component 64 can optionally comprise one or more engagement members 100 that can mate with one or more respective engagement members 102 of the buckle cover 66, as illustrated in FIGS. 3, 4, and 6. In accordance with some embodiments, the engagement members 100 of the mounting component 64 can comprise one or more protrusions. The protrusions can have cross-sectional profiles that can mate, interact, or engage with corresponding cavity or recess features of the engagement members 102 of the buckle cover 66.

As illustrated in the embodiment shown in FIGS. 3-6, the engagement members 100 of the mounting component 64 can slide into engagement with recesses of the engagement members 102 of the buckle cover 66. The engagement members 100 can comprise a T-shaped cross-section that is configured to follow and match a shape of an exterior surface 104 of the buckle cover 66. As illustrated in FIG. 4, the engagement members 100, 102 can help collectively form or provide a smooth, continuous outer surface of the drawing device 10 that allows the user to not only have a desirable ergonomic, easy-to-grasp contour or profile for the drawing device 10, but advantageously also permits the user quick and easy visual or tactile verification that the mounting component 64 is positioned within the drawing device 10. Such embodiments can provide a manner for verifying the presence of the cartridge 60 and mounting component 64, providing at least a hint or reminder to the user that at least the cartridge 60, and perhaps the material 32 for use in the drawing device 10, may not be present or loaded into the drawing device 10.

The embodiment illustrated in FIGS. 4-6 of the cartridge assembly 30 also illustrates that the buckle cover 66 can comprise a cartridge cavity or receptacle 110 into which the cartridge 60 can be received, as illustrated in FIGS. 4 and 5. The cartridge receptacle can comprise one or more rib members 112 that provide a support against which the cartridge 60 can be contacted for facilitating the positioning and rotation of the cartridge 60 within the cartridge receptacle 110. Additionally, the buckle cover 66 can comprise a receptacle mounting wall or bracket 114 through which the rotational aperture 72 can extend and whereagainst the cartridge 60 can be positioned in the loaded configuration. Additionally, the mounting bracket can comprise a discharge aperture 120, axially spaced apart from the rotational aperture 72 and the cartridge axis 78, in order to permit material positioned within the cartridge 60 to pass through the discharge aperture 120 toward the nozzle assembly 20.

Optionally, the buckle cover 66 can also comprise one or more coupling members 130. The coupling members can be positioned adjacent to and interface between the buckle cover 66 and the housing 12 of the drawing device 10. The coupling members can mechanically, magnetically, or otherwise engage or mate with respective coupling members 132 of the housing 12. Referring again to FIG. 3, the drawing device 10 can comprise a docking receptacle 140, wherein the cartridge assembly 30 can be received. The coupling members 132 of the housing can be positioned adjacent to or within the docking receptacle 140. As illustrated in FIGS. 2 and 3, the coupling members 132 can extend from the housing into the docking receptacle 140. The respective coupling members 130 of the buckle cover 66 can engage with the coupling members 132 disposed within the docking receptacle 140. Thus, when the cartridge assembly 30 is positioned within the docking receptacle 140, the engagement between the coupling members 130, 132 can ensure that the cartridge assembly 30 remains engaged with the housing 12 of the drawing device 10 and does not become accidentally dislodged or separated from the drawing device 10.

In some embodiments, the coupling members 130, 132 can comprise one or more magnets that attract to each other, respectively, thus making the cartridge assembly easy to couple to the drawing device 10, while securely engaging the cartridge assembly 30 in the loaded position. Moreover, with sufficient, intentional exertion by the user, the cartridge assembly 30 can be removed. For example, the cartridge assembly 30 can be removed from the docking receptacle 140 by positioning the user's fingers into or underneath the disengagement recesses 142 and separating the cartridge assembly 30 from the docking receptacle 140. The disengagement recesses 142 can be located along a perimeter of the docking receptacle 140. An embodiment of the disengagement recesses 142 and the docking receptacle 140, along with the protruding coupling members 132 is illustrated in FIG. 3.

Optionally, the coupling members 130 can be correspondingly recessed into the buckle cover 66, thereby providing both a magnetic attraction, as well as a mechanical engagement between the buckle cover 66 and the docking receptacle 140 that limits one or more degrees of freedom of movement of the buckle cover 66 relative to the docking receptacle 140 when the cartridge assembly 30 is received and coupled to the docking receptacle 140.

In some embodiments, the cartridge assembly 30 can be configured as a rotatable component having a plurality of chambers that can each be loaded with one or more pellets 32 of material 32. For example, referring to FIGS. 4-6. The cartridge can comprise one or more chambers 150. The embodiment illustrated in these figures has five chambers, but other embodiments can be developed that have two, three, four, six, or more chambers. In accordance with some embodiments, the cartridge 60 may advantageously comprise at least two chambers 150 in order to allow the user to operate the drawing device 10 over a series of cycles and/or to allow the user to load and dispense different types of materials from the drawing device 10.

In accordance with some embodiments, the chambers 150 of the cartridge 60 can have a cylindrical shape that allows the material to be loaded thereunto. Additionally, the chambers 150 can be symmetrically and/or evenly spaced about the cartridge axis 78. Such alignment can facilitate that each of the chambers 150 be rotatable into axial alignment with the discharge aperture 120 of the buckle cover 66. In this regard, the discharge aperture 120 may be sized to be at least equal to the cross-sectional profile or dimension of each of the chambers 150 in order to permit the material 32 to be driven through the discharge aperture 120. As will be discussed further below, during operation of the drawing device 10, each of the chambers 150 can successively be rotated about the cartridge axis 78 and the material 32 disposed within the chambers 150 can be driven out of the chambers 150, through the discharge aperture 120, and into the nozzle assembly 20 where the material 32 is melted and extruded out of the exit nozzle 50.

The modular nature of the cartridge assembly 30 and the docking receptacle 140 can provide numerous advantages and benefits that have hitherto been unavailable for a device intended to utilize distinct materials, such as sugar, gummy, plastics, or other such materials. The modularity and ease of loading, including both the disassembly and assembly of the components illustrated and described herein, allows a user to quickly remove the cartridge assembly 30, load it with a desired array of materials (e.g., pellets 32), and immediately couple the cartridge assembly 30 to the drawing device 10 for use. The facility of disassembly of some embodiments also enables a user to clean and/or replace components, as needed, for maintenance of the device.

The modularity of the drawing device 10 also advantageously allows quick disassembly, cleaning, and assembly of the drawing device 10. Applicant has found that the provision of multiple cartridge assemblies can also allow the user to have substantial uninterrupted and dedicated time using the drawing device 10 with only minimal pauses to change out the cartridge assembly.

These and other advantages of the presently disclosed drawing device have not been possible using other conventional devices. Other attempts to create viable drawing pens have failed due to the poor design, slow operation, slow loading, and other problematic aspects of prior art devices, and have not necessarily even contemplated the challenges and developments presented in accordance with some embodiments disclosed herein. Indeed, in contrast to those conventional devices, the present disclosure provides a drawing device that can advantageously be loaded or unloaded quickly, has a simple and robust assembly of components, and requires a minimal material travel distance during the extrusion process. These, among other advantages, create a reliable, commercially significant product that will enable the creation of culinary and other works of art that by providing a reliable and free, uninterrupted workflow and creativity, as never before possible.

Aspects of the loading and assembly of material with the drawing device 10 have been discussed and will be further discussed with regard to FIGS. 7-12. As noted above, the types of material, including the color, shape, and properties thereof can be varied according to the desires of the user. It is envisioned that the device can use various types of material, such as sugar, gummy (e.g., gelatin), isomalt, chocolate, dough (e.g., pasta dough, bread dough, cookie dough, etc., which can be cooked during/by the extrusion process), wax, animal fats, tapioca, cheese, toffy, jams, preserves, corn puffs, ground meat, meat, potatoes, or other edible materials or clays, ceramics, or other curable crafting materials. Such materials may be used and loaded into one or more of the chambers 150 of the cartridge 60.

Optionally, the user may perform methods in which different material types are loaded into the same cartridge 60, thereby allowing the user to define or perform a sequential process in which a first material is extruded onto a substrate, and thereafter, additional materials (which may have different colors, properties, or other characteristics) may be overlaid onto the first extruded material, thereby providing a complex interplay of layers and material properties, as desired by the user. For example, the chambers 150 can be loaded with pellets 32 of sugar that each have different colors. The operation of the drawing device 10 can thereby produce a multitude of sequential colors for the user.

Referring now to FIGS. 7-12, other aspects and operation of the drawing device 10 will be discussed in greater detail.

In accordance with some embodiments, the handheld extrusion drawing device provides the user with a controllable flow of material through the drawing device toward the nozzle assembly, for extrusion out of the exit nozzle. As noted above, various efforts have been made in conventional devices that fail to provide the user with a meaningful degree of uninterrupted, low-maintenance operation of the drawing device. Instead, such devices require significant user interaction and manipulation in order to reload material or load different types of materials. Further such devices also require that the user pause for significant periods of time while the device resets or becomes ready for additional use. Such devices tend to provide only a single, low-volume operation that requires the user to wait during phases of the operation of the device instead of providing a substantial amount of material with different, desired properties, in a substantially continuous operation, as disclosed in accordance with some embodiments therein. Accordingly, these and other advantages are possible using features of the drawing device disclosed herein.

The drawing device can advantageously incorporate a reloading mechanism. The drawing device can also comprise a retraction mechanism. The retraction mechanism can be manually or automatically activated. In accordance with some embodiments, these mechanisms can be incorporated into a single drawing device or the omitted from the drawing device, as desired.

FIGS. 7-12 illustrate various components of an embodiment of the drawing device 10. While this embodiment illustrates a drawing device in which a retraction mechanism is used in conjunction with a reloading mechanism, these mechanisms can be incorporated independently of each other, and be manually or automatically activated. As discussed further herein, although the retraction mechanism and the reloading mechanism can operate or function in a dependent manner in the drawing device 10, these mechanisms can also function independently of each other.

Figure 11:
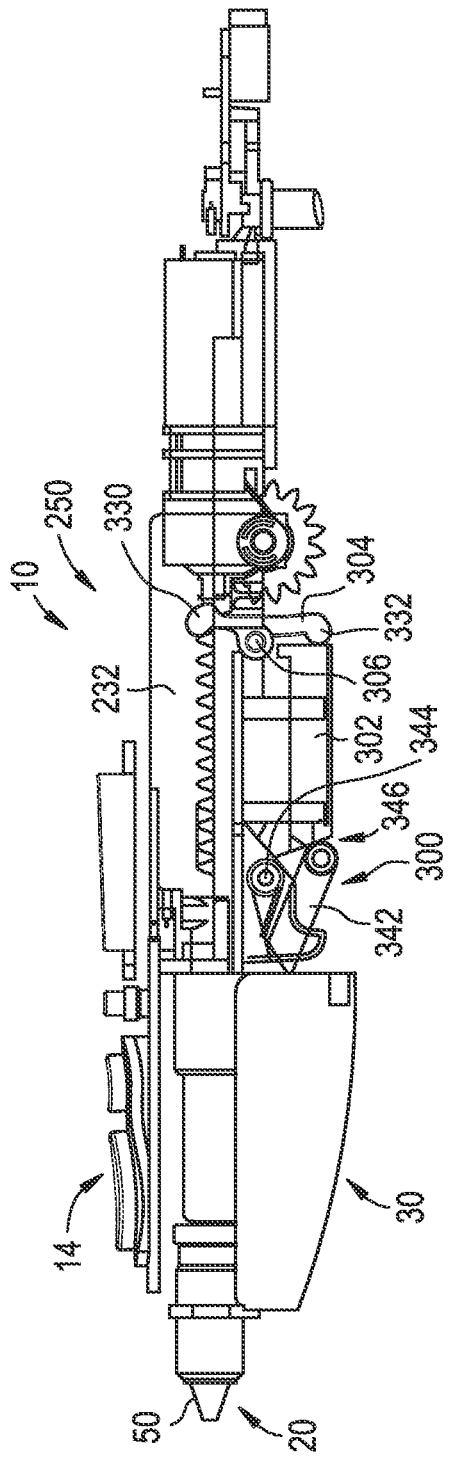
FIGS. 11 and 12 are side views of a drawing device, wherein the housing has been removed for illustrating internal components thereof, showing extended and retracted positions of the pushrod, according to some embodiments.
Figure 12:
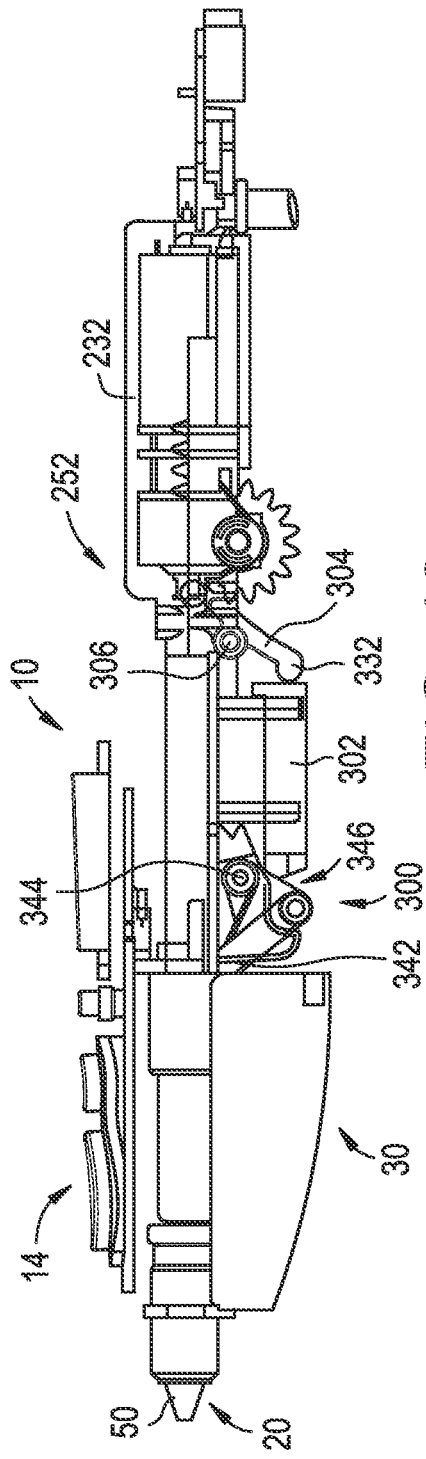

FIGS. 7 and 8 illustrate, bottom, rear perspective views of the drawing device 10 without the housing 12 in order to illustrate aspects of the components of the drawing device 10. FIGS. 9-12 illustrate side views of the drawing device 10, with FIGS. 9 and 10 illustrating cross-sectional views taken along section lines 9-9 of FIG. 3. Further, FIGS. 11 and 12 illustrate side views of the drawing device 10, wherein the housing has been omitted in order to show details of the components of the drawing device 10. FIGS. 9 and 11 illustrate the drawing device 10 in a state wherein the advancement mechanism is positioned in a fully extended position 250. FIGS. 10 and 12 illustrate the advancement mechanism in a fully retracted position. Furthermore, FIGS. 9 and 11 also illustrate the reloading mechanism in a disengaged position. FIGS. 10 and 12 illustrate the reloading mechanism in an engaged, driving position.

FIGS. 7 and 8 illustrate various components of the drawing device 10. FIG. 7 illustrates that the drawing device 10 can comprise a fixing or mounting plate 200. The fixing plate 200 can be configured so as to allow various components of the drawing device 10 to be mounted or coupled thereto, including fixed, sliding, or rotational couplings, as illustrated in discussed herein. The fixing plate 200 can extend at least partially along a length of the drawing device 10 and be disposed within at least a portion of the housing 12. FIG. 8 illustrates the components of the drawing device 10 while omitting the fixing plate 200 in order to more clearly depict features of the components of the drawing device 10.

As illustrated in FIGS. 7 and 8, the drawing device 10 can comprise a driving mechanism, such as motor 210, that is operatively connected to a gear assembly 212 for driving motion of the material within the drawing device 10. However, as noted above, some embodiments do not use a motor, but instead use a manually inputted driving force, such as a type of spring (coil or leaf), user-applied force, or other driving mechanism. Referring to FIGS. 7 and 8, the motor 210 and the gear assembly 212 can be actuated in response to a signal generated by electrical components 220 of the drawing device 10, using the actuator 14. The electrical components 220 can comprise one or more circuits, motherboards, PCBs, wires, batteries, such as rechargeable batteries, lights, and other electronic features that can allow the user to control one or more functions of the drawing device 10.

The retraction mechanism can operate in conjunction with or in response to the motor 210 and the gear assembly 212. For example, in the embodiment illustrated in these figures, the gear assembly 212 can comprise a skip gear 230 that permits the motor 210 to drive motion of the skip gear 230 in a single direction until the skip gear 230 rotates a predetermined amount, whereat the motor 210 can pause, thereby allowing the skip gear 230 to maintain a retraction-permitting position. Thus, the skip gear 230 can define a driving rotational position in which the teeth of the skip gear 230 are engaged with a rack 232 of the advancement mechanism 214 and a disengaged position in which teeth of the skip gear 230 are no longer engaged with teeth of the rack 232, thereby allowing the rack 232 two move relative to the skip gear 230. In some embodiments, a perimeter of the skip gear 230 can have a toothed portion and a toothless portion or section 234 in which there is a gap between the teeth of the skip gear 230. The gap can be sufficiently wide to permit the rack 232 to become disengaged from the skip gear 230.

The retraction mechanism can allow the motor 210 to advance the rack 232 to the fully extended position 250, as shown in FIG. 9. The rack 232 can be driven to the fully extended position 250 by rotation of the skip gear 230. However, at approximately the moment illustrated in FIG. 9, wherein teeth of the skip gear 230 are rotated beyond the position shown in FIG. 9 and in the direction 254 illustrated therein, the skip gear can 230 can thereafter disengage from the rack 232 when a toothless portion 234 of the skip gear 230 is rotated to a position adjacent to the teeth of the rack 232.

The disengagement between the skip gear 230 and the rack 232 is illustrated in FIG. 10. As shown therein, the teeth of the rack 232 are out of contact with the teeth of the skip gear 230 due to the rotational position of the skip gear 230, in which the toothless portion 234 of the skip gear 230 is rotated to be adjacent to the teeth of the rack 232.

In accordance with some embodiments, a cycle of the skip gear from a leading tooth 260 to a final tooth 262 can have a total drive time of between about 5 seconds and about 25 seconds, between about 10 seconds and about 20 seconds, or about 15 seconds.

Thus, upon actuation of the actuators 14, the motor can drive the skip gear forward in the direction 254 at a rate in which about three quarters of the circumference or perimeter of the skip gear 230 completes a rotation in a given cycle time.

Optionally, the advancement mechanism 214 can be configured to permit the skip gear 230 to stay at the disengaged position 270 for a dedicated period of time without rotational movement or the skip gear 230 can continue to rotate at a constant rate, thereby providing sufficient time for the rack 232 to move from the fully extended position, 250 to the fully retracted position 252.

The electrical components 220 of the drawing device 10 can be programmed to allow the drawing device 10 to function in a manner that allows a complete cycle to occur in which the skip gear 230 drives the rack 232 to the fully extended position 250 and then disengages from the rack 232 for a specific period of time until the rack 232 reaches the fully retracted position 252.

In some embodiments, a cycle can be performed as the skip gear 230 completes a full rotation from the disengaged position 270, shown in FIG. 10. Thus, the user can actuate, push, or trigger the actuator 14, thereby causing the skip gear 230 to begin rotating from the disengaged position 270 until the teeth of the skip gear 230 begin to contact the teeth of the rack 232 and drive motion of the rack completely to the fully extended position 250, whereafter continued motion of the skip gear 230 beyond the position shown in FIG. 9 will cause the toothless portion 234 of the skip gear to reach the disengaged position 270, as shown in FIG. 10. Once in the disengaged position 270, the rack 232 can be manually or automatically driven or pulled or otherwise moved back to the fully retracted position 252.

Retraction of the rack 232, whether accomplished manually or automatically via a motor or other driving mechanism, can be facilitated using a mechanical component, such as a spring, which can contract or expand to urge the rack 232 away from the fully extended position 250.

An embodiment of such a mechanical component is illustrated in FIGS. 9 and 10 as the spring 280. As shown in FIGS. 9 and 10, as the rack 232 is driven towards the fully extended position 250, the spring 280 can be pulled and extended away from a rest position such that when the rack 232 reaches the fully extended position 250, the spring 280 has a high degree of potential energy that can be used once the skip gear 230 reaches the disengaged position 270 in order to pull the rack 232 toward the fully retracted position 252.

Alternatively, the spring 280 can be compressed as the rack 232 is driven toward the fully extended position 250, whereafter the spring can expand and drive the rack 232 back toward the fully retracted position 252. Other various configurations can be developed that allow the rack 232 to be driven toward the fully extended position, 250 and pulled or pushed back to the fully retracted position 252. In this manner, the retraction mechanism can allow the user to selectively activate the advancement mechanism, driving the rack 232 forward until the pushrod 236 has urged all of the material out of the active chamber 150, as shown in FIG. 9. Thereafter, the rack 232 and the pushrod 236 can be moved to the fully retracted position 252, in which the pushrod 236 has fully exited the active chamber 150.

Referring still to FIGS. 7 and 8, in accordance with some embodiments, the drawing device 10 can also comprise a reloading mechanism. The reloading mechanism can be manually or automatically activated. The reloading mechanism can comprise one or more components that are configured to move or rotate material within the housing so that the material can be driven toward the exit nozzle of the drawing device 10.

For example, the material can be positioned in the chambers of the cartridge assembly and rotated sequentially so that the pushrod 40 drives the material toward the nozzle assembly 20 to be extruded out of the exit nozzle 50. The reloading mechanism can function to reload or reposition material within the drawing device 10 in response to a signal from the user, a mechanical force within the drawing device 10 in the course of operation of other components or mechanisms within the drawing device 10, or in response to a mechanical force exerted by the user.

In the embodiment illustrated in FIGS. 7 and 8, the reloading mechanism can comprise a driving linkage 300, an index rod 302, and a reverse linkage 304. The driving linkage 300, the index rod 302 and the reverse linkage 304 can functionally cooperate to convert linear movement to a rotational movement imparted to the cartridge 60 of the cartridge assembly 30.

For example, the reverse linkage 304 can comprise an elongate member that is pivotally coupled to the fixing plate 200 in a manner that permits opposing ends to contact a portion of the rack 232 and the index rod 302. The reverse linkage 304 can pivot between alternating positions and impart a force to the indexing rod 302 that can thereafter be imparted to the driving linkage 300 in order to actuate the reloading mechanism and thereby convert linear motion to rotational motion at the cartridge 60.

The actuation of the reverse linkage 304 will now be described with reference to a first position shown in FIGS. 9 and 11 a second position shown in FIGS. 10 and 12. For example, in FIGS. 9 and 11, the reverse linkage 304 is shown in a first position in which the rack 232 is in the extended position, and therefore, the rack 232 is not in contact with or does not exert a rotational force on the reverse linkage 304. Accordingly, although the reverse linkage 304 may be in contact with the index rod 302, the reverse linkage 304 may not exert a driving force on the index rod 302. Accordingly, a biasing mechanism, such as the spring noted above, retains the or maintains the indexing rod 302 and the driving linkage 300 in a disengaged position.

However, referring to FIGS. 10 and 12, when the rack 232 rebounds or moves to the retracted position 252, a portion of the rack 232, or a component coupled thereto, such as an abutting member 320, can the translated into contact against a rack end portion or element 330 of the reverse linkage 304, thereby causing the reverse linkage 304 to pivot about its pivot point 306, thereby moving an index end portion or element 332 of the reverse linkage 304 into contact with the index rod 302. As the index end portion 332 contacts the index rod 302, an axial force can be imparted to the index rod 302 by the index end portion 332 of the reverse linkage 304, thereby driving translation or other movement of the index rod 302 and actuating the driving linkage 300.

As the driving linkage 300 is actuated from a non-cartridge-driving position (shown in FIGS. 9 and 11), the driving linkage 300 can contact an engagement member 340, such as a protrusion or detent feature, of the cartridge 60 to drive motion of the cartridge 60 to a cartridge-driven position (shown in FIGS. 10 and 12). Contact against the engagement member 340 via the driving linkage 300 can cause a rotational force to be exerted on the cartridge 60 about the cartridge axis 78.

For example, referring to FIG. 4, the engagement member 340 of the cartridge 60 can extend in a radial direction from the cartridge axis 78 or center of the cartridge 60 along a proximal end of the cartridge 60. The driving linkage 300 can comprise a driving member 342 that can rotate about a driving pivot point 344 (shown in FIGS. 7-12) as the driving linkage 300 is contacted by a distal end portion or contact interface 346 of the index rod 302.

As illustrated in FIGS. 9 and 10, the contact interface 346 of the index rod 302 can be shaped or configured to mate with the driving linkage 300 at different longitudinal positions in which the contact interface 346 portion abuts a portion of the driving linkage 300 (such as an intermediate or pivot linkage 348 that is pivotally coupled to the driving member 342).

Referring to FIG. 9, the contact interface 346 can comprise a first face disposed at a first angle, relative to the longitudinal axis 78 of the device 10, which can contact the pivot link 348 when in the non-cartridge-driving position, shown in FIGS. 9 and 11. For example, the contact interface 346 can contact a side or face of the pivot link at a first pitch or angle that allows the contact interface 346 to generally match or mate against side or face of the pivot link 348 in the non-cartridge-driving position.

Further, the contact interface 346 can comprise a second face disposed at a second angle, relative to the longitudinal axis 78 of the device 10, which can contact the pivot link 348 when in the cartridge-driven position, shown in FIGS. 10 and 12. For example, the contact interface 346 can contact the side or face of the pivot link 348 at a second pitch or angle that allows the contact interface 346 to generally match or mate against side or face of the pivot link 348 as the pivot link 348 moves toward the cartridge-driven position.

Further, as the index rod 302 is driven distally toward the cartridge-driven position, the cartridge 60 will rotate to axially align the next chamber with the push rod 40. The movement of the driving linkage 300 to the cartridge-driven position creates contact against and rotation of the cartridge 60 from a prior or first rotational position to a second rotational position. In particular, as the driving linkage 300 is engaged and moves in response to the distal motion of the index rod 302 and the contact interface 346, the pivot link 348 will pivot about the pivot point 344. As this happens, the pivot link 348 can come into contact with a second sloped surface of the contact interface 346 of the index rod 302, as shown in FIG. 10.

As noted above, the rack 232 can move between an extended position 250 and a retracted position 252. In accordance with some embodiments, the rack 232 can engage with one or more biasing members along a proximal or distal end thereof. A biasing member can be directly or indirectly coupled to, mounted to, or in engagement with, an internal structure of the housing and directly or indirectly with a portion of the rack 232, such that the biasing member is compressed or stretched as the rack 232 moves toward or is driven toward the extended position by action of the motor 210. Once the rack 232 has reached the fully extended position 250, the biasing member can drive the rack back to the disengaged position.

In some embodiments, once the rack 232 has reached the fully extended position 250, the advancing mechanism 214 can use a skip gear 230 having a toothless portion 234, as discussed above. Accordingly, during a disengaged state with the skip gear 230, the rack 232 can be pushed or pulled back to the retracted position 252 by action of the rack biasing member.

Alternatively, once the rack 232 has reached the fully extended position 250, the motor 210 can pause or enter an "off" state during which the biasing member drive or return the rack 232 to the retracted position 252 by overcoming a frictional force or idle state of the motor 210, thereby cause a shaft of the motor 210 to spin in reverse in a reversing stage. The biasing member can thus drive the rack 232 back to the disengaged or retracted position 252 against friction of an inactive motor. In such embodiments, the motor can be in a powered off state or a non-driven state and simply be overcome by the biasing member. Accordingly, the motor can remain enmeshed or in rotational engagement with the rack 232 in such embodiments, and only exert a positive driving force on the rack 232 when actuated by the user, and only up to the fully extended position 250. Thereafter, the motor 210 can be rotated backwards by function of the rack biasing member.

As noted above, the loading mechanism for the device can be configured can advantageously facilitate use of the 3D drawing pen, for example, by providing a substantial or semi-continuous supply of material to the nozzle assembly for extrusion and artistic creation. Various types of loading mechanisms, for example, including an advancement mechanism, a cartridge, a belt system, a hopper, a revolver cartridge, a screw drive system, a wave generator, and/or a reloader mechanism, can be incorporated into one or more embodiments of the 3D drawing pen. FIGS. 13A-18 illustrate these and other features, which can be individually modified or interchangeably incorporated into one or more embodiments of the drawing pen disclosed herein.

Referring now to FIGS. 13A-18, the side views of embodiments of advancement and reloading mechanisms and components thereof that can optionally be incorporated into the drawing device, according to some embodiments.

Figure 13A:
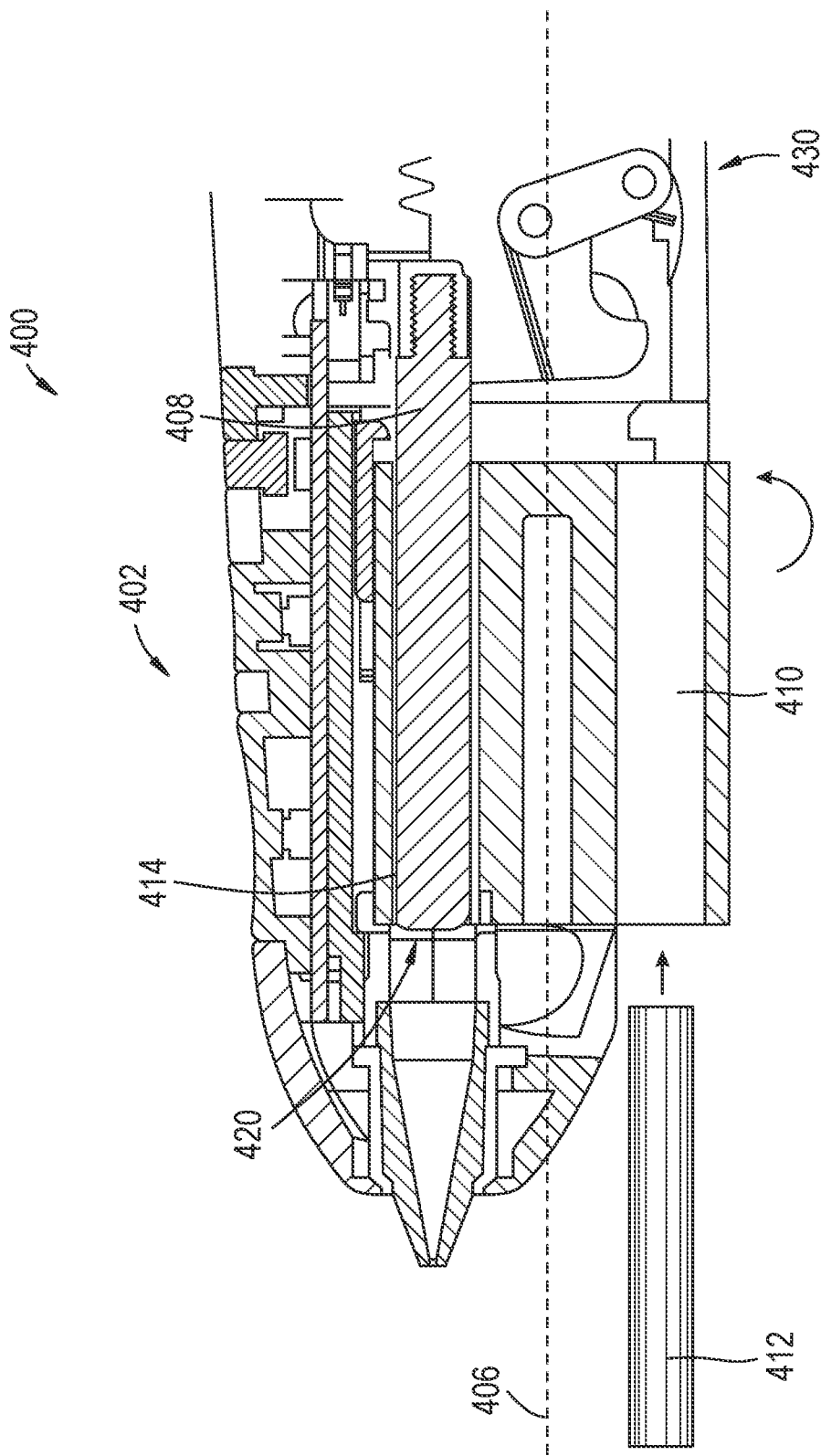
FIGS. 13A and 13B are side cross-sectional views of a cartridge-type drawing device, according to some embodiments.
Figure 13B:
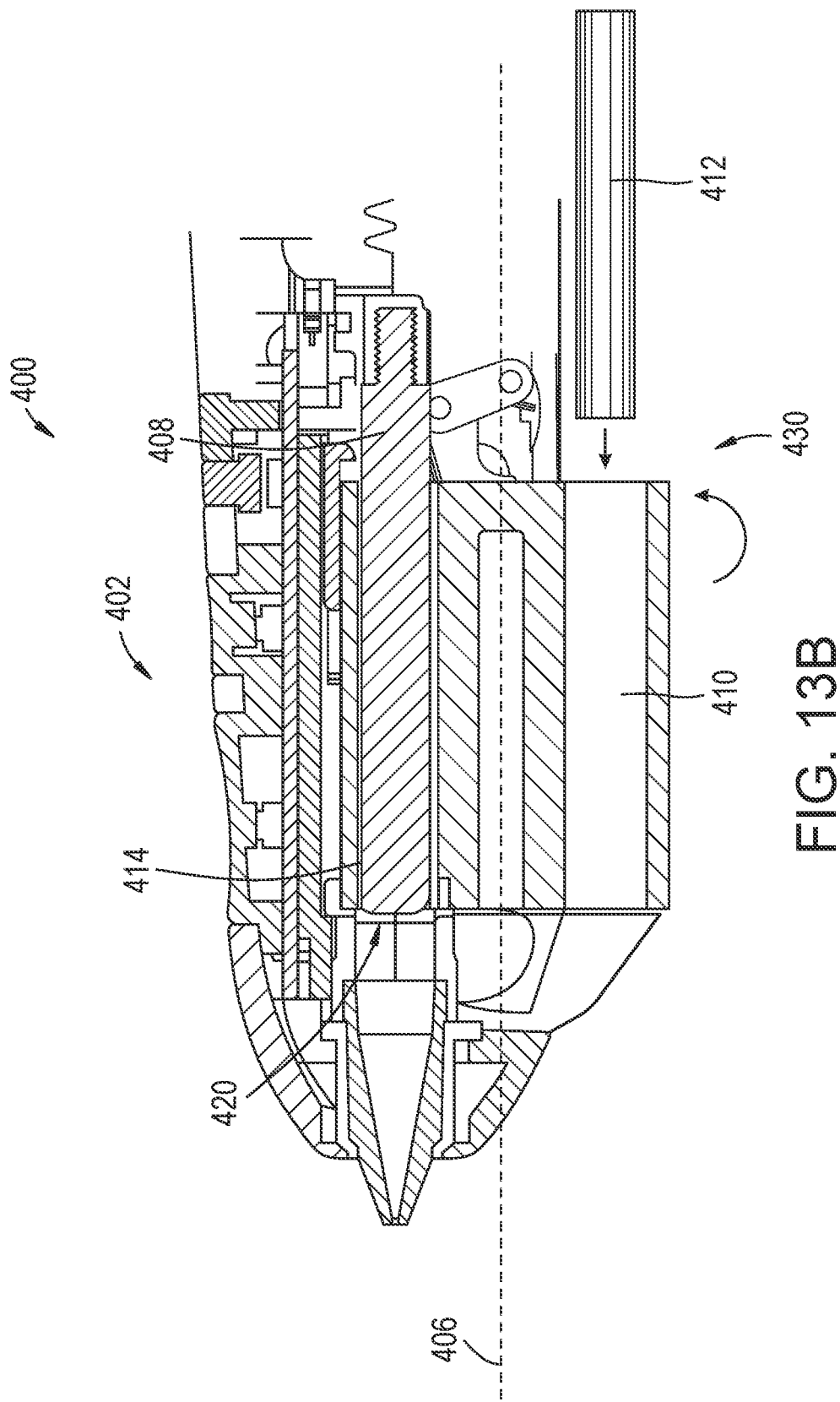

FIGS. 13A and 13B are side cross-sectional views of embodiments of a drawing device 400 having a loading mechanism 402 that comprises a revolver cartridge 404. The revolver cartridge 404 can be coupled to the body of the drawing device 400 and rotatable about an axis 406. The axis 406 can extend parallel relative to a longitudinal axis of an advancing mechanism or plunger 408. As the cartridge 404 rotates about the axis 406, individual slots or barrels 410 can be positioned to permit a pellet 412 of material to be loaded into the barrel 410, rotated about the axis 406, and driven from a ready or active position 420.

FIGS. 13A and 13B illustrate that the plunger 408 has moved all of the way into the barrel 414 so as to drive a pellet 412 of material into the heating element and out through the exit nozzle. One of the benefits of the embodiments shown in FIGS. 13A and 13B is that the revolver cartridge 404 is position such that the barrel 410 is exposed and available for loading.

As shown in FIG. 13A, the barrel 410 can be loaded in a direction toward the proximal end of the pen. However, some embodiments can be configured such that the barrel allows insertion of material in a direction toward the distal end or tip of the pen, as shown in FIG. 13B.

Figure 14:
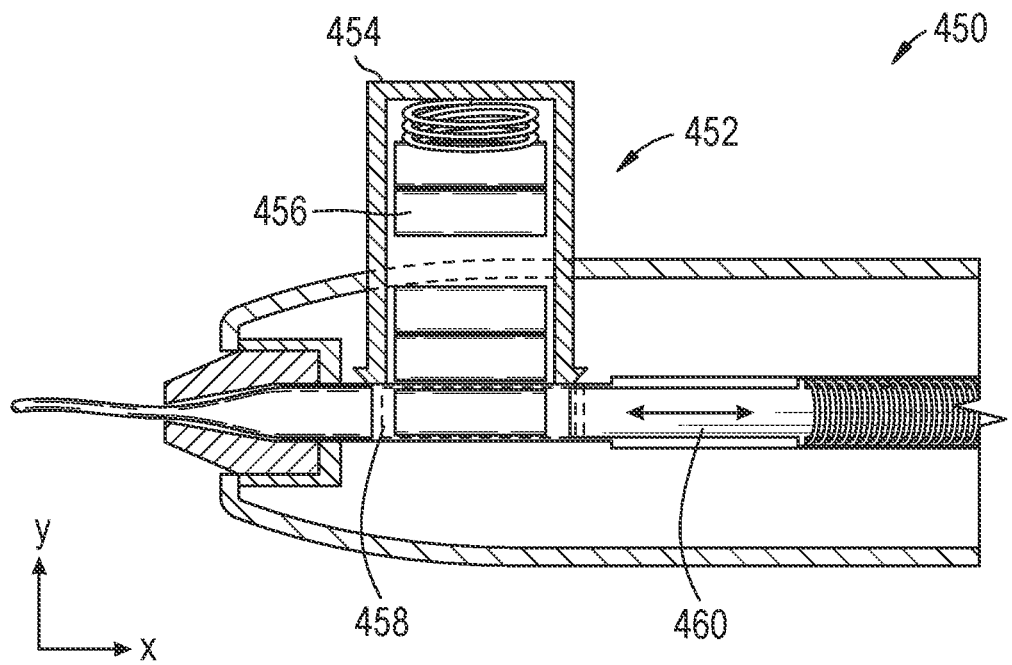
FIG. 14 is a side, cross-sectional view of a cartridge-type drawing device that utilizes a spring-type discharge driver for the cartridge, according to some embodiments.

FIG. 14 illustrates an embodiment of a drawing device 450 having a loading mechanism 452 that comprises advancement and reloading mechanisms that use a clip or clip mechanism 454. The clip 454 can carry several pellets 456 of material. In such embodiments, the clip 454 can be coupled to the device, such as along a side thereof, thereby enabling the material 456 housed within the clip to be delivered into the device for use.

For example, the clip 454 can comprise an inner volume into which the material 456 is loaded and a driving component that urges the material 456 out of the volume and into the device. The driving component can comprise a spring or other structure that provides a driving force to cause the material 456 to move toward a loading chamber 458 of the device.

Once positioned in the loading chamber 458 in a driving position, a pushrod 460 of the device can urge the material 456 toward the nozzle assembly for extrusion. The user can actuate the device (e.g., using a conventional actuation mechanism, such as via a button or other actuator, which can directly or indirectly permit the pushrod 460 to be in an activated state and axially driven by the spring force).

As in any of the embodiments shown in FIGS. 1-18, in some embodiments of the device 500, the pushrod 460 can be manually activated, such as by allowing the user to pull the pushrod 460 against a spring force to preload the pushrod 460 to a driving position (pulled to arm the pushrod 460).

As in any of the embodiments shown in FIGS. 1-18, in some embodiments of the device 500, the pushrod 460 can be activated by a motor, a type of spring (coil or leaf), user-applied force, or other driving mechanism, for example, that uses one or more gears to convert rotational force into linear motion of the pushrod 460.

Upon actuation, the pushrod 460 can exert an axial force against the material 456 in the loading chamber 458, thereby driving the material 456 toward the nozzle assembly and moving the pushrod 460 toward a driven position. The pushrod 460 can then be pulled back against the spring force toward the driving position, thereby clearing the loading chamber 458 and permitting the clip mechanism to urge additional material 456 into the loading chamber 458 so that the device is again in a ready state to permit the user to actuate the device and continue the extrusion process.

Figure 15:
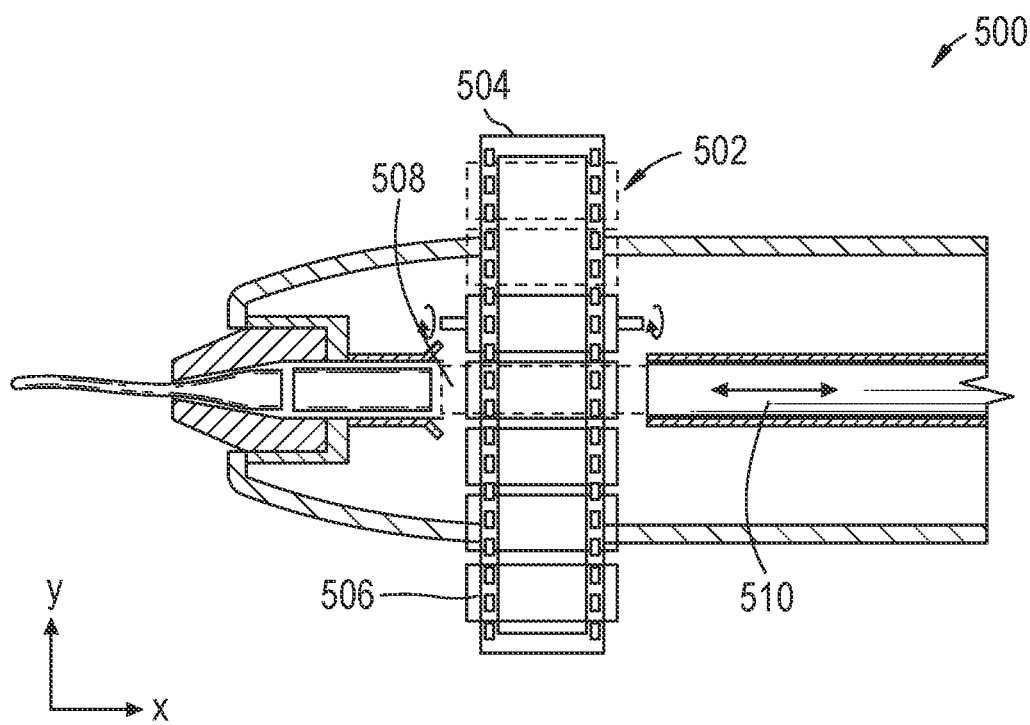
FIG. 15 is a side, cross-sectional view of a cartridge-type drawing device that utilizes a belt-type discharge driver for the cartridge, according to some embodiments.

FIG. 15 illustrates an embodiment of a drawing device 500 having a loading mechanism 502 that comprises advancement and reloading mechanisms that use a belt drive mechanism 504. The belt drive mechanism 504 can use a belt 504 that carries material 506 and can be fed into and through the device to rapidly load additional material 506 into a loading chamber 508 of the device. Once material 506 is positioned in the loading chamber 508, the material 506 can be driven toward the nozzle assembly for extrusion by a pushrod 510.

In some embodiments, the belt 504 can be drawn or mechanically pulled through the device, whether manually or automatically. The belt 504 can advance or be advanced each time material 506 carried by the belt 504 and positioned in the loading chamber 508 (e.g., axially aligned with the nozzle assembly). The advancement can thereby move additional material 506 carried by the belt 504 into a ready position for being driven by the pushrod 510. As such, the user can complete subsequent cycles of in which material 506 is driven through the loading chamber 508 to the nozzle assembly.

The belt 504 can be fed into the housing of the device 500 through a first side aperture and out of a second side aperture as the belt 504 is advanced and used. The first and second side apertures can be disposed adjacent to a distal end portion of the housing of the device 500, near the nozzle assembly.

In some embodiments, the belt 504 can be reusable, permitting the user to reload the belt 504 with additional material. Additionally, the belt 504 can be a single-use or disposable part.

Figure 16:
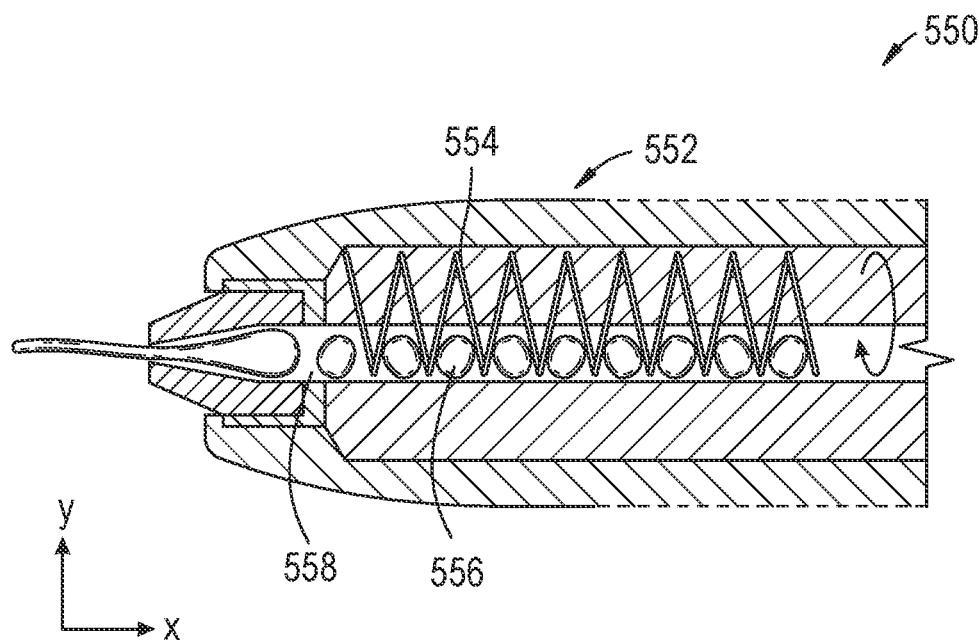
FIG. 16 is a side, cross-sectional view of a drawing device having a screw-drive-type discharge driver, according to some embodiments.

For example, FIG. 16 illustrates an embodiment of a drawing device 550 having a loading mechanism 552 that comprises a reloading mechanism that uses a screw drive mechanism 554. Such embodiments can comprise an Archimedes screw 554 that can rotate within the device (e.g., within and driving material 556 toward a loading chamber 558) and permit material 556 to be driven within the device toward the nozzle assembly for extrusion. The material 556 can comprise pellets, such as spherical beads.

The screw 554 can be coupled to and driven via a motor, a type of spring (coil or leaf), user-applied force, or other driving mechanism. Whether motor or manually activated, the screw 554 can rotate upon actuation by the user to selectively feed material 556 toward the nozzle assembly.

Further, the material 556 can be fed into the loading chamber via a hopper that can be coupled to the device at a proximal end portion or side door or port of the device.

Figure 17A:
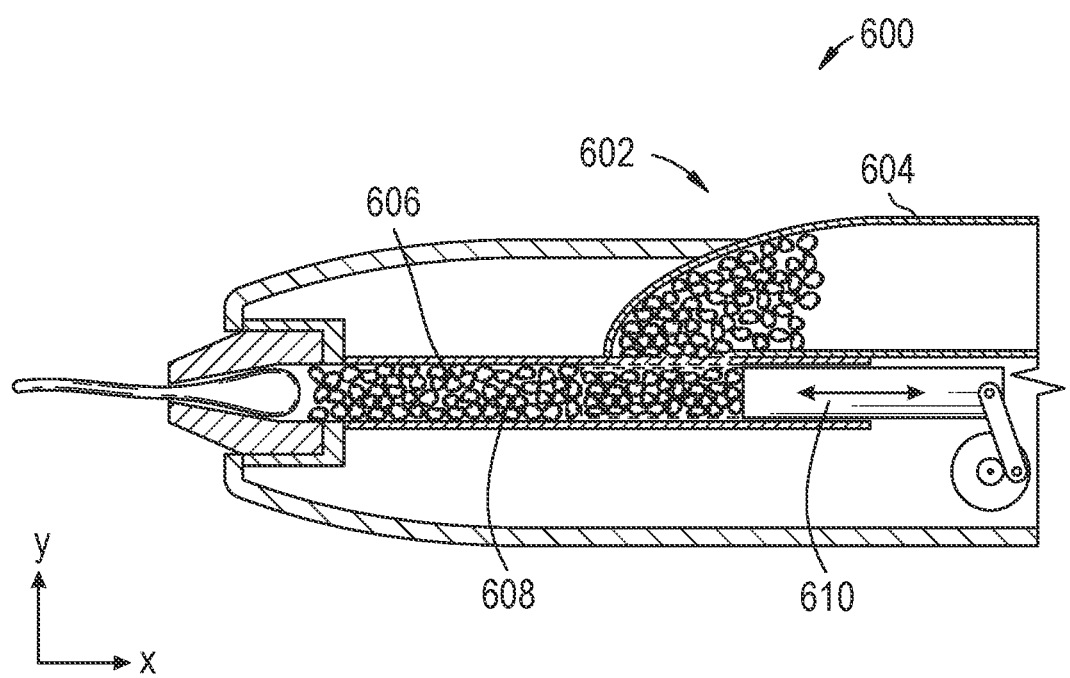
FIGS. 17A and 17B are side, cross-sectional views of a drawing device having a pusher-type discharge driver, according to some embodiments.
Figure 17B:
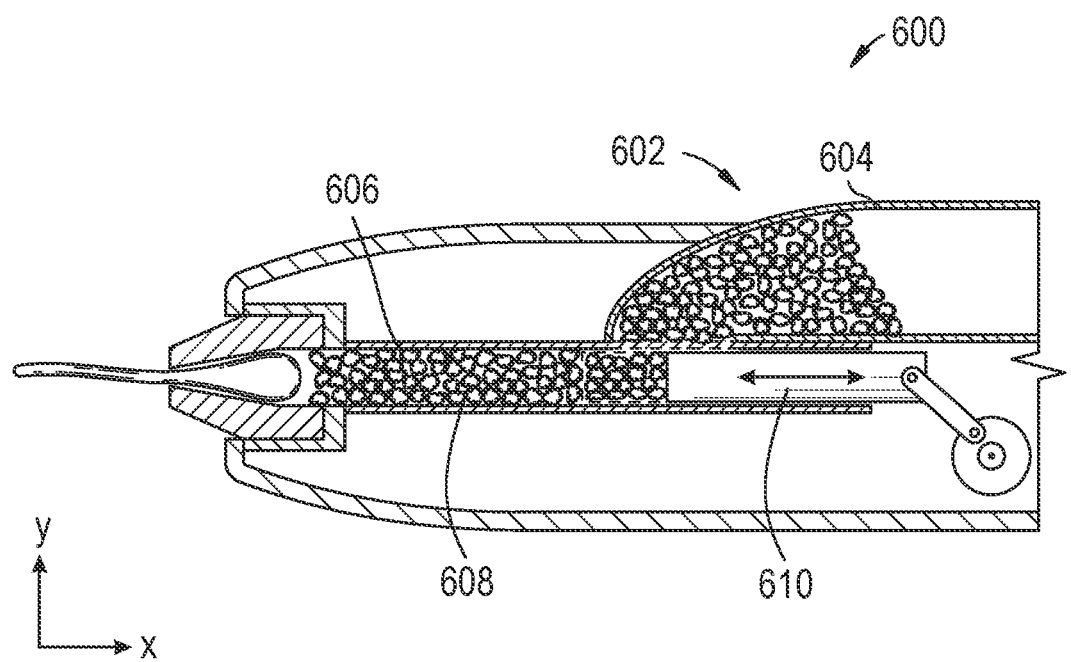

Next, FIGS. 17A and 17B illustrate an embodiment of a drawing device 600 having a loading mechanism 602 that comprises advancement and reloading mechanisms that use a push drive mechanism and hopper 604. The push drive mechanism and hopper 604 can be manually or automatically activated. In some embodiments, the reloading mechanism can comprise a driving mechanism input that can activate the push drive mechanism and assist in evacuating and driving material 606 from the hopper 604 to the nozzle assembly.

Some embodiments can comprise a pushrod 610 that can reciprocate within the device 600 (e.g., within a loading chamber 608) and permit material 606 or consumables to be driven within the device 600 toward the nozzle assembly for extrusion.

The material 606 can comprise pellets, which can be of any geometry, such as a non-uniform or variable geometry. Further, the material 606 can be fed into the loading chamber 608 via the hopper 604.

In some embodiments, the hopper 604 can be removably coupled to the device 600 at a proximal end portion or side door or port of the device 600. The push rod mechanism 610 can compact and drive the material 606 with power input (e.g., DC or stored energy or manual input, and drive the pushrod 610 from an open or loading position as shown in FIG. 17A to a compacting or driven position, as shown in FIG. 17B)

Figure 18:
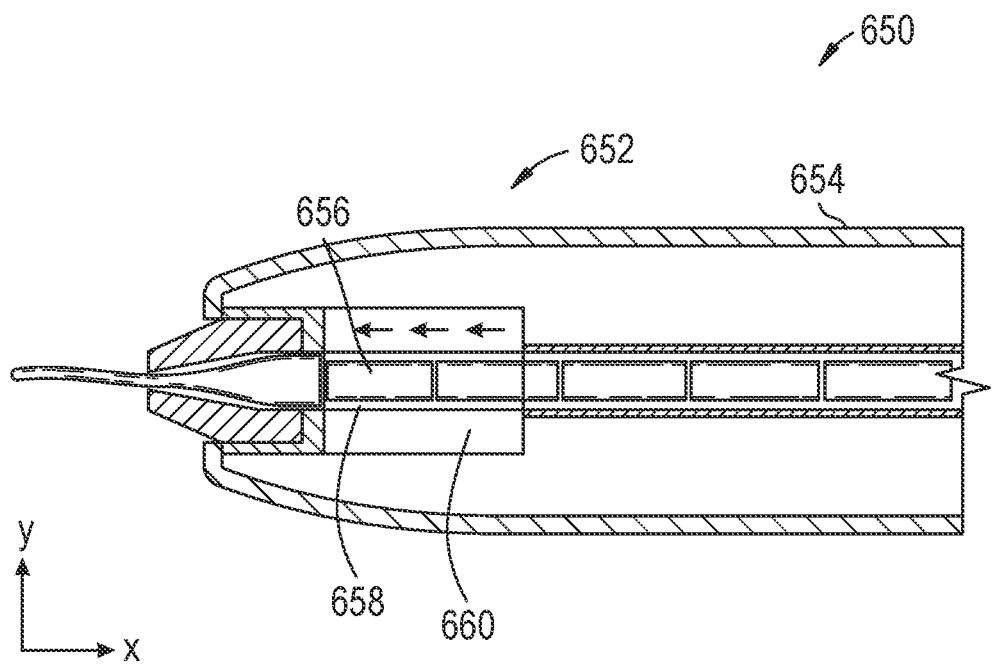
FIG. 18 is a side, cross-sectional view of a drawing device having a wave-generator-type discharge driver, according to some embodiments.

Finally, FIG. 18 illustrates yet another embodiment of a drawing device 650 having a loading mechanism 652 that comprises advancement and reloading mechanisms. In FIG. 18, the reloading mechanism using a wave generator mechanism 652. In such embodiments, material 656 can be loaded into the device 650 into a rear entry aperture (not shown) at a proximal end of the device and/or via a hopper or other material-carrying cartridge. For example, the aperture can comprise a restrictor that permits insertion of material into the aperture, but restricts accidental removal (e.g., by gravity) of the material 656 therefrom.

Once in the device 650, the material 656 can be driven within the device 650 toward the nozzle assembly for extrusion using the wave generator mechanism 652. The wave generator mechanism 652 can comprise an actuator portion 660 that produces and transmits a linear actuation to the material or pellets 656, such as by ultrasonically driven or undulation mechanics. Optionally and/or alternatively, the actuator portion 660 can also generate a compressive, rolling action or peristaltic action that urges material 656 through the device 650 toward the nozzle assembly.

Advantageously, the hoppers, cartridges, clips, and belts that can be used in accordance with some embodiments of the reloading mechanisms provide a quick and simple manner of achieving steady or continuous usage of the device, with minimal interruption to the user. These and other features can allow the user to focus more on the actual work being performed using the device rather than getting the device to work properly.

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A handheld drawing device comprising: a housing having an internal volume, a longitudinal axis, and a port that permits access to the internal volume of the housing a nozzle assembly coupled to the housing and comprising an exit nozzle and a heating element for melting a pellet of material; and a loading mechanism being configured to permit the pellet to be driven to and supported at an active position within the housing to permit the heating element to melt the pellet.

Clause 2. The drawing device of Clause 1, wherein the loading mechanism is configured to support the pellet at the port of the housing.

Clause 3. The drawing device of any of the preceding Clauses, wherein the loading mechanism comprises a cartridge that is removably couplable to the port of the housing.

Clause 4. The drawing device of Clause 3, wherein the cartridge having a rotation axis and a plurality of chambers disposed thereabout, each of the plurality of chambers being configured to support a plurality of pellets therein and being rotatable about the rotation axis to selectively position an active chamber of the plurality of chambers in alignment with the longitudinal axis at an active position.

Clause 5. The drawing device of Clause 4, wherein the loading mechanism further comprises an advancing mechanism for causing rotation of the cartridge and driving the pellet from the active chamber toward the heating element.

Clause 6. The drawing device of Clause 5, further comprising a pushrod disposed within the housing and translatable along the longitudinal axis, the pushrod being movable into the active chamber toward an extended position for driving the pellet out of the active chamber toward the heating element for melting the pellet and extruding the material.

Clause 7. The drawing device of Clause 6, wherein the advancing mechanism comprises a link system that is actuated by movement of the pushrod in a direction away from the extended position to cause the link system to contact a driving member against a cartridge for positioning additional material to the active position.

Clause 8. The drawing device of Clause 7, wherein the link system comprises a pivoting reverse linkage, a driving rod, and a pivoting advancement linkage.

Clause 9. The drawing device of Clause 6, further comprising a motor configured to drive motion of the pushrod to the extended position.

Clause 10. The drawing device of Clause 9, wherein the pushrod is coupled to a rack that engages with a gear of the motor.

Clause 11. The drawing device of Clause 6, further comprising a spring mechanism configured to drive motion of the pushrod to the extended position.

Clause 12. The drawing device of Clause 6, wherein the pushrod automatically returns to a loading position from the extended position.

Clause 13. The drawing device of Clause 6, further comprising an actuator configured to activate a motor to control movement of the pushrod and thereby extrude the pellet from the exit nozzle.

Clause 14. The drawing device of Clause 6, further comprising a reversing mechanism configured to drive the pushrod out of a loading chamber of the device.

Clause 15. The drawing device of Clause 14, wherein the reversing mechanism comprises a spring configured to urge the pushrod away from the active chamber.

Clause 16. The drawing device of Clause 14, wherein the pushrod comprises a rack that is matingly engaged with a gear drive.

Clause 17. The drawing device of Clause 4, wherein each of the plurality of chambers is cylindrical.

Clause 18. The drawing device of Clause 3, wherein the cartridge comprises five chambers.

Clause 19. The drawing device of Clause 3, wherein the cartridge comprises at least two chambers.

Clause 20. The drawing device of Clause 3, wherein the cartridge is coupled to a removable cover portion of the housing, the cartridge and the removable cover portion cooperating as a single unit to permit insertion or removal of the cartridge from the housing.

Clause 21. The drawing device of Clause 20, wherein the removable cover portion comprises an external surface that matches a contour or surface continuity of an exterior surface of the housing adjacent to the port.

Clause 22. The drawing device of any of the preceding Clauses, wherein the loading mechanism comprises a clip mechanism.

Clause 23. The drawing device of any of the preceding Clauses, wherein the loading mechanism comprises a revolver cartridge.

Clause 24. The drawing device of any of the preceding Clauses, wherein the loading mechanism comprises a belt wherealong a plurality of pellets of material are supported.

Clause 25. The drawing device of any of the preceding Clauses, wherein the loading mechanism comprises a screw drive mechanism.

Clause 26. The drawing device of any of the preceding Clauses, wherein the loading mechanism comprises a manual pushrod mechanism.

Clause 27. The drawing device of any of the preceding Clauses, wherein the loading mechanism comprises a wave generator mechanism.

Clause 28. The drawing device of any of the preceding Clauses, wherein the exit nozzle is positioned along the longitudinal axis.

Clause 29. The drawing device of any of the preceding Clauses, wherein the heating element is positioned intermediate the exit nozzle and the loading mechanism.

Clause 30. The drawing device of any of the preceding Clauses, wherein the housing being configured to fit in a user's hand and configured without a handle substantially perpendicular to the housing.

Clause 31. The drawing device of any of the preceding Clauses, wherein the drawing device is a three-dimensional (3D) drawing pen that is configured to permit drawing in 3D space.

Clause 32. The drawing device of any of the preceding Clauses, wherein the heating element is positioned adjacent to the exit nozzle and configured to melt the pellet of material prior to extrusion through the exit nozzle.

Clause 33. The drawing device of any of the preceding Clauses, wherein the housing comprises a length between a first end and a second end, the length being greater than a maximum transverse extent of the housing.

Clause 34. The drawing device of any of the preceding Clauses, wherein the device is configured to extrude the pellet out of the exit nozzle in a continuous, vertical form.

Clause 35. A handheld drawing device comprising: a housing having an internal volume, a longitudinal axis, and a port that permits access to the internal volume of the housing; a loading mechanism that is removably couplable to the port of the housing, the loading mechanism being configured to support consumable material therein and being configured to selectively position the material in alignment with the longitudinal axis at an active position; and a nozzle assembly coupled to the housing and comprising an exit nozzle and a heating element.

Clause 36. The drawing device of Clause 35, wherein the loading mechanism comprises a cartridge that is removably insertable into the port of the housing, the cartridge having a rotation axis and a plurality of chambers disposed thereabout, each of the plurality of chambers being configured to support a pellet of material therein and being rotatable about the rotation axis to selectively position an active chamber of the plurality of chambers in alignment with the longitudinal axis at an active position.

Clause 37. The drawing device of Clause 36, further comprising a pushrod disposed within the housing and translatable along the longitudinal axis, the pushrod being movable into the active chamber toward an extended position for driving the pellet out of the active chamber toward the heating element for melting the pellet and extruding the material.

Clause 38. The drawing device of Clause 37, further comprising a motor configured to drive motion of the pushrod to the extended position.

Clause 39. The drawing device of Clause 38, wherein the pushrod is coupled to a rack that engages with a gear of the motor.

Clause 40. The drawing device of Clause 37, further comprising a spring mechanism configured to drive motion of the pushrod to the extended position.

Clause 41. The drawing device of Clause 38, further comprising an actuator configured to activate the motor to control movement of the pushrod and thereby extrude the pellet from the exit nozzle.

Clause 42. The drawing device of Clause 37, further comprising an advancing mechanism for causing rotation of the cartridge.

Clause 43. The drawing device of Clause 42, wherein the advancing mechanism comprises a link system that is actuated by movement of the pushrod in a direction away from the extended position.

Clause 44. The drawing device of Clause 43, wherein the link system comprises a pivoting reverse linkage, a driving rod, and a pivoting advancement linkage.

Clause 45. The drawing device of any of Clauses 35-44, wherein the exit nozzle is positioned along the longitudinal axis.

Clause 46. The drawing device of Clause 36, wherein the cartridge comprises five chambers.

Clause 47. The drawing device of Clause 36, wherein the cartridge comprises at least two chambers.

Clause 48. The drawing device of Clause 36, wherein the heating element is positioned intermediate the exit nozzle and the loading mechanism.

Clause 49. The drawing device of Clause 36, wherein each of the plurality of chambers is cylindrical.

Clause 50. The drawing device of Clause 37, wherein the pushrod automatically returns to a loading position from the extended position.

Clause 51. The drawing device of Clause 37, further comprising a reversing mechanism configured to drive the pushrod out of a loading chamber of the device.

Clause 52. The drawing device of Clause 51, wherein the reversing mechanism comprises a spring configured to urge the pushrod away from the active chamber.

Clause 53. The drawing device of Clause 51, wherein the pushrod comprises a rack that is matingly engaged with a gear drive.

Clause 54. The drawing device of Clause 36, wherein the cartridge is coupled to a cover portion of the housing, the cartridge and the cover portion cooperating as a single unit to permit insertion or removal of the cartridge from the housing and to provide surface continuity for an exterior of the housing adjacent to the port.

Clause 55. The drawing device of any of Clauses 35-54, wherein the housing is configured to fit in a user's hand as a pen and configured without a handle substantially perpendicular to the housing.

Clause 56. The drawing device of any of Clauses 35-55, wherein the drawing device is a three-dimensional (3D) drawing pen that is configured to permit drawing in 3D space.

Clause 57. The drawing device of any of Clauses 35-56, wherein the housing comprises an upper housing and a lower housing, at least one of the upper housing and the lower housing comprising a cooling port proximate to the nozzle assembly.

Clause 58. The drawing device of any of Clauses 35-57, wherein the heating element is positioned adjacent to the exit nozzle and configured to melt the material prior to extrusion through the exit nozzle.

Clause 59. The drawing device of any of Clauses 35-58, wherein the housing comprises a length between a first end and a second end, the length being greater than a maximum transverse extent of the housing.

Clause 60. The drawing device of any of Clauses 35-59, wherein the device is configured to extrude a pellet of material out of the exit nozzle in a continuous, vertical form.

Clause 61. A modular cartridge assembly for use in a handheld drawing device, the assembly comprising a mounting component having an engagement cavity, a cartridge having a plurality of chambers and being configured to be received at least partially within the engagement cavity, and a cover member having an engagement section to which engagement members of the mounting component can be coupled for mounting the cartridge against the cover member to permit the cartridge to rotate about a longitudinal axis to align an active chamber of the plurality of chambers in a target position relative to the cover member.

Clause 62. The cartridge assembly of Clause 61, further comprising a mounting bracket extending from the cover member, the mounting bracket defining a cartridge receptacle into which the cartridge is received in an assembled configuration in which the mounting component is coupled to the cover member.

Clause 63. The cartridge assembly of Clause 62, wherein the mounting bracket comprises a discharge aperture with which the active chamber can be rotationally aligned.

Clause 64. The cartridge assembly of Clause 61, further comprising a plurality of magnetic coupling members.

Clause 65. A drawing device comprising the cartridge assembly of any of Clauses 61-64.

Clause 66. A handheld drawing device comprising: a housing having an internal volume, a longitudinal axis, and a port that permits access to the internal volume of the housing; a cartridge that is removably insertable into the port of the housing, the cartridge having a rotation axis and a plurality of chambers disposed thereabout, each of the plurality of chambers being configured to support a pellet of material therein and being rotatable about the rotation axis to selectively position an active chamber of the plurality of chambers in alignment with the longitudinal axis at an active position; and an advancing mechanism configured to drive material out of the active chamber when positioned at the active position, the advancing mechanism comprising a pushrod having an extended position and a retracted position, the pushrod being movable to the extended position to drive the material out of the active chamber and being configured to move to the retracted position.

Clause 67. The drawing device of Clause 66, wherein the advancing mechanism comprises a motor and a skip gear coupled to the motor for driving the pushrod to the extended position, the motor being configured to rotate the skip gear to a position in which the pushrod is disengaged with the skip gear for permitting the pushrod to be moved to the retracted position.

Clause 68. The drawing device of Clause 67, wherein the pushrod is coupled to a spring that exerts a retracting force on the pushrod for automatically retracting the pushrod when the pushrod is disengaged from the skip gear.

Clause 69. The drawing device of any of Clauses 66-68, wherein the pushrod is coupled to a spring that exerts a retracting force on the pushrod for automatically retracting the pushrod from the extended position toward the retracted position.

Clause 70. A handheld drawing device comprising: a housing having an internal volume, a longitudinal axis, and a port that permits access to the internal volume of the housing; a cartridge that is removably insertable into the port of the housing, the cartridge having a rotation axis and a plurality of chambers disposed thereabout, each of the plurality of chambers being configured to support a pellet of material therein and being rotatable about the rotation axis to selectively position an active chamber of the plurality of chambers in alignment with the longitudinal axis at an active position; and a rotating mechanism configured to rotate the cartridge to align another of the plurality of chambers at the active position.

Clause 71. The drawing device of Clause 70, wherein the rotating mechanism comprises a driving linkage configured to convert longitudinal motion to drive a rotational motion of the cartridge.

Clause 72. The drawing device of Clause 71, further comprising an advancing mechanism that is configured to drive material from the active chamber for extruding from the drawing device and, upon return to a retracted position, provide a longitudinal force that activates the driving linkage.

Clause 73. The drawing device of any of the preceding Clauses, further comprising a loading mechanism and an advancement mechanism that drives material from an active chamber of the device toward the nozzle assembly.

Clause 74. The drawing device of any of the preceding Clauses, further comprising a loading mechanism that comprises a clip mechanism, a screw drive mechanism, a belt mechanism, a manual pushrod mechanism, and/or a wave generator mechanism.

Further Considerations

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

As used herein, the term "about" is relative to the actual value stated, as will be appreciated by those of skill in the art, and allows for approximations, inaccuracies and limits of measurement under the relevant circumstances. In one or more aspects, the terms "about," "substantially," and "approximately" may provide an industry-accepted tolerance for their corresponding terms and/or relativity between items, such as a tolerance of from less than one percent to ten percent of the actual value stated, and other suitable tolerances.

As used herein, the term "comprising" indicates the presence of the specified integer(s), but allows for the possibility of other integers, unspecified. This term does not imply any particular proportion of the specified integers. Variations of the word "comprising," such as "comprise" and "comprises," have correspondingly similar meanings.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the detailed description contains many specifics, these should not be construed as limiting the scope of the subject technology but merely as illustrating different examples and aspects of the subject technology. It should be appreciated that the scope of the subject technology includes other embodiments not discussed in detail above. Various other modifications, changes and variations may be made in the arrangement, operation and details of the method and apparatus of the subject technology disclosed herein without departing from the scope of the present disclosure. In addition, it is not necessary for a device or method to address every problem that is solvable (or possess every advantage that is achievable) by different embodiments of the disclosure in order to be encompassed within the scope of the disclosure. The use herein of "can" and derivatives thereof shall be understood in the sense of "possibly" or "optionally" as opposed to an affirmative capability.

What is claimed is:

1. A handheld drawing device comprising:
   a housing having an internal volume, a longitudinal axis, and a port along a side area of the housing that permits access to the internal volume of the housing in a direction transverse relative to the longitudinal axis;
   a nozzle assembly coupled to a distal end portion of the housing adjacent to the port and comprising an exit nozzle and a heating element for melting a pellet of material; and
   a cartridge assembly comprising a removable cover portion and a cartridge supported by the removable cover portion, the cartridge assembly being insertable into the port in a direction transverse relative to a longitudinal axis of the housing, the removable cover portion being removably mountable to housing at the port, the cartridge having one or more chambers configured to receive the pellet and to be aligned with the nozzle assembly when the removable cover portion is coupled to the housing the pellet to be driven to and supported at an active position within the housing to permit the heating element to melt the pellet.

2. The drawing device of claim 1, wherein the cartridge comprises a rotation axis and a plurality of chambers disposed thereabout, each of the plurality of chambers being configured to support one or more pellets therein and being rotatable about the rotation axis to selectively position an active chamber of the plurality of chambers in alignment with the longitudinal axis at an active position.

3. The drawing device of claim 2, further comprising an advancing mechanism for causing rotation of the cartridge and driving the pellet from the active chamber toward the heating element.

4. The drawing device of claim 3, further comprising a pushrod disposed within the housing and translatable along the longitudinal axis, the pushrod being movable into the active chamber toward an extended position for driving the pellet out of the active chamber toward the heating element for melting the pellet and extruding the material.

5. The drawing device of claim 4, wherein the advancing mechanism comprises a link system that is actuated by movement of the pushrod in a direction away from the extended position to cause the link system to contact a driving member against a cartridge for positioning additional material to the active position.

6. The drawing device of claim 5, wherein the link system comprises a pivoting reverse linkage, a driving rod, and a pivoting advancement linkage.

7. The drawing device of claim 4, further comprising a spring mechanism configured to drive motion of the pushrod to the extended position.

8. The drawing device of claim 4, further comprising sensor configured to activate a motor to control movement of the pushrod and thereby extrude the pellet from the exit nozzle.

9. The drawing device of claim 4, further comprising a reversing mechanism configured to drive the pushrod out of a loading chamber of the device.

10. The drawing device of claim 1, wherein at least a portion of the cartridge is exposed along the side area of the housing to permit the cartridge to be rotatable relative to the removable cover portion and to the port of the housing.

11. The drawing device of claim 10, wherein the cartridge and the removable cover portion cooperate as a single unit to permit insertion or removal of the cartridge from the housing, the cartridge being rotatably supported by the removable cover portion.

12. The drawing device of claim 1, further comprising a clip mechanism for loading material into the device.

13. The drawing device of claim 1, further comprising a belt wherealong a plurality of pellets of material are supported for loading material into the device.

14. The drawing device of claim 1, further comprising a screw drive mechanism, a manual pushrod mechanism, or a wave generator mechanism for loading material into the device.

15. A handheld drawing device comprising:
a housing having an internal volume, a longitudinal axis, and a side port that permits access to the internal volume of the housing in a direction transverse relative to the longitudinal axis;
a cartridge assembly that is removably couplable to the side port of the housing by inserting the cartridge assembly into the side port in a direction that is transverse relative to a longitudinal axis of the housing, the cartridge assembly being configured to support consumable material therein and being configured to selectively position the material in alignment with the longitudinal axis at an active position; and
a nozzle assembly coupled to the housing and comprising an exit nozzle and a heating element.

16. The drawing device of claim 15, wherein the cartridge assembly comprises a cartridge that is removably insertable into the side port of the housing, the cartridge having a rotation axis and a plurality of chambers disposed thereabout, each of the plurality of chambers being configured to support a pellet of material therein and being rotatable about the rotation axis to selectively position an active chamber of the plurality of chambers in alignment with the longitudinal axis at an active position.

17. The drawing device of claim 16, further comprising a pushrod disposed within the housing and translatable along the longitudinal axis, the pushrod being movable into the active chamber toward an extended position for driving the pellet out of the active chamber toward the heating element for melting the pellet and extruding the material.

18. The drawing device of claim 15, wherein the cartridge assembly comprises a removable cover portion and a cartridge, and wherein at least a portion of the cartridge is exposed along a side area of the housing to permit the cartridge to be rotatable relative to the removable cover portion and to the side port of the housing.

19. The drawing device of claim 15, wherein the cartridge comprises a rotation axis and a plurality of chambers disposed thereabout, each of the plurality of chambers being configured to support one or more pellets therein and being rotatable about the rotation axis to selectively position an active chamber of the plurality of chambers in alignment with the longitudinal axis at an active position.

20. The drawing device of claim 15, wherein the cartridge assembly comprises a removable cover portion and a cartridge that cooperate as a single unit to permit insertion or removal of the cartridge assembly from the housing, the cartridge being rotatably supported by the removable cover portion.

* * * * *